United States Patent
Kanemoto et al.

(10) Patent No.: US 11,247,341 B2
(45) Date of Patent: Feb. 15, 2022

(54) CONTROL APPARATUS, TRANSPORT APPARATUS, COMPUTER READABLE STORAGE MEDIUM, AND CONTROL METHOD

(71) Applicant: MUJIN, Inc., Tokyo (JP)

(72) Inventors: Yoshiki Kanemoto, Tokyo (JP); Rosen Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/882,518

(22) Filed: May 24, 2020

(65) Prior Publication Data
US 2021/0094187 A1    Apr. 1, 2021

Related U.S. Application Data

(63) Continuation of application No. PCT/JP2019/042671, filed on Oct. 30, 2019.
(Continued)

(30) Foreign Application Priority Data

Sep. 26, 2019    (JP) .............................. JP2019-175477

(51) Int. Cl.
*B25J 9/16*    (2006.01)
*B25J 9/00*    (2006.01)
(Continued)

(52) U.S. Cl.
CPC ........... *B25J 9/1697* (2013.01); *B25J 9/0093* (2013.01); *B25J 13/085* (2013.01);
(Continued)

(58) Field of Classification Search
CPC .... B25J 9/1697; B25J 13/085; B25J 15/0616; B25J 9/1653; B25J 9/0093; B25J 9/1638;
(Continued)

(56) References Cited

U.S. PATENT DOCUMENTS

2009/0200978 A1    8/2009 Kato
2016/0016311 A1    1/2016 Konolige et al.
(Continued)

FOREIGN PATENT DOCUMENTS

CN    1718152 A     1/2006
CN    106256631 A    12/2016
(Continued)

OTHER PUBLICATIONS

Ishida Co., Ltd, Dynamic Weighing Systems IMAS-G, https://www.ishida.co.jp/ww/jp/products/weighing/dynamicweighingsystem/imas-g.cfm.
(Continued)

*Primary Examiner* — Bao Long T Nguyen
(74) *Attorney, Agent, or Firm* — Medler Ferro Woodhouse & Mills PLLC

(57) ABSTRACT

A control apparatus includes a force sensation information acquiring unit for acquiring force sensation information representing a magnitude of at least one of a force and a torque at a distal end of a manipulator while a target item is being transported; a mass information acquiring unit for acquiring mass information representing a mass of the item; a plan information acquiring unit for acquiring plan information representing content of a plan of a trajectory; a force sensation estimating unit for estimating a magnitude of at least one of a force and a torque to be detected at the distal end of the manipulator; and a first detecting unit for detecting an abnormality, based on the magnitude of at least one of the force and the torque represented by the force sensation information and the magnitude of at least one of the force and the torque estimated by the estimating unit.

15 Claims, 10 Drawing Sheets

Related U.S. Application Data

(60) Provisional application No. 62/752,756, filed on Oct. 30, 2018.

(51) Int. Cl.

| | | |
|---|---|---|
| *B25J 15/06* | (2006.01) | |
| *B25J 13/08* | (2006.01) | |
| *G06T 1/00* | (2006.01) | |
| *G06T 7/66* | (2017.01) | |
| *B65G 47/91* | (2006.01) | |
| *B65G 61/00* | (2006.01) | |
| *G06T 7/13* | (2017.01) | |
| *G06T 7/50* | (2017.01) | |
| *G06K 9/62* | (2022.01) | |
| *G06T 7/00* | (2017.01) | |
| *G06K 9/46* | (2006.01) | |
| *G06K 9/00* | (2022.01) | |

(52) U.S. Cl.
CPC .......... *B25J 15/0616* (2013.01); *B65G 47/91* (2013.01); *B65G 61/00* (2013.01); *G06K 9/00664* (2013.01); *G06K 9/4609* (2013.01); *G06K 9/6215* (2013.01); *G06T 1/0014* (2013.01); *G06T 7/001* (2013.01); *G06T 7/13* (2017.01); *G06T 7/50* (2017.01); *G06T 7/66* (2017.01); *G05B 2219/39001* (2013.01); *G05B 2219/40067* (2013.01); *G06T 2207/20212* (2013.01)

(58) Field of Classification Search
CPC ..................... G06T 7/66; G06T 1/0014; G05B 2219/39001; G05B 2219/40067; G05B 19/404–406; G05B 19/4062; G05B 2219/40541; B65G 61/00; B65G 47/91
USPC ...... 700/259, 254, 256; 318/568.16, 568.24; 901/9, 33, 34
See application file for complete search history.

(56) References Cited

U.S. PATENT DOCUMENTS

| | | |
|---|---|---|
| 2016/0176052 A1 | 6/2016 | Yamamoto |
| 2018/0050451 A1* | 2/2018 | Takanishi ............... B25J 9/1653 |
| 2019/0240841 A1* | 8/2019 | Ooba ..................... H04N 5/225 |
| 2020/0030978 A1 | 1/2020 | Diankov |

FOREIGN PATENT DOCUMENTS

| | | |
|---|---|---|
| CN | 106489030 A | 3/2017 |
| DE | 102012015975 A1 | 3/2013 |
| DE | 102012017328 A1 | 3/2013 |
| DE | 102015012232 A1 | 3/2016 |
| DE | 102015016341 A1 | 6/2016 |
| DE | 102017125924 A1 | 5/2018 |
| JP | 1104988 A | 4/1999 |
| JP | 2002283276 A | 10/2002 |
| JP | 2009184095 A | 8/2009 |
| JP | 2012196749 A | 10/2012 |
| JP | 2013193158 A | 9/2013 |
| JP | 2013212564 A | 10/2013 |
| JP | 2016117141 A | 6/2016 |
| JP | 2019136808 A | 8/2019 |
| WO | 2018185861 A1 | 10/2018 |

OTHER PUBLICATIONS

Decision to Grant a Patent issued for counterpart Japanese Application No. 2019-175477, issued by the Japan Patent Office dated Oct. 8, 2019 (drafted on Oct. 3, 2019).

Written Opinion of the International Search Authority for International Patent Application No. PCT/JP2019/042671, mailed by the Japan Patent Office dated Dec. 17, 2019.

Office Action dated Oct. 30, 2019, in Chinese Patent Appl. No. 202010451622.1 (with english translation).

Office Action dated Nov. 25, 2020, in German Patent Appl. No. 11 2019 000 170.1 (with English translation).

\* cited by examiner

CONTROL APPARATUS, TRANSPORT APPARATUS, COMPUTER READABLE STORAGE MEDIUM, AND CONTROL METHOD

CROSS REFERENCE TO RELATED APPLICATION

This is a continuation application of International Application No. PCT/JP2019/042671 filed on Oct. 30, 2019, which claims priority to the U.S. Provisional Application No. 62/752,756 filed in US on Oct. 30, 2018 and Japanese Patent Application No. 2019-175477 filed in JP on Sep. 26, 2019, the contents of each of which are incorporated herein by reference.

BACKGROUND

1. Technical Field

The present invention relates to a control apparatus, a transport apparatus, a computer readable storage medium, and a control method.

2. Related Art

A transfer apparatus is known that transfers items using a robot arm, as shown in Non-Patent Document 1, for example.

Non-Patent Document 1: ISHIDA CO., LTD, "Dynamic Weighing Systems IMAS-G", [Online], [Search: Jul. 15, 2019], Internet: <haps://www.ishida.co.jp/ww/jp/products/weighing/dynamicweighingsystem/imas-g.cfm>

DESCRIPTION OF EXEMPLARY EMBODIMENTS

Figure 1:
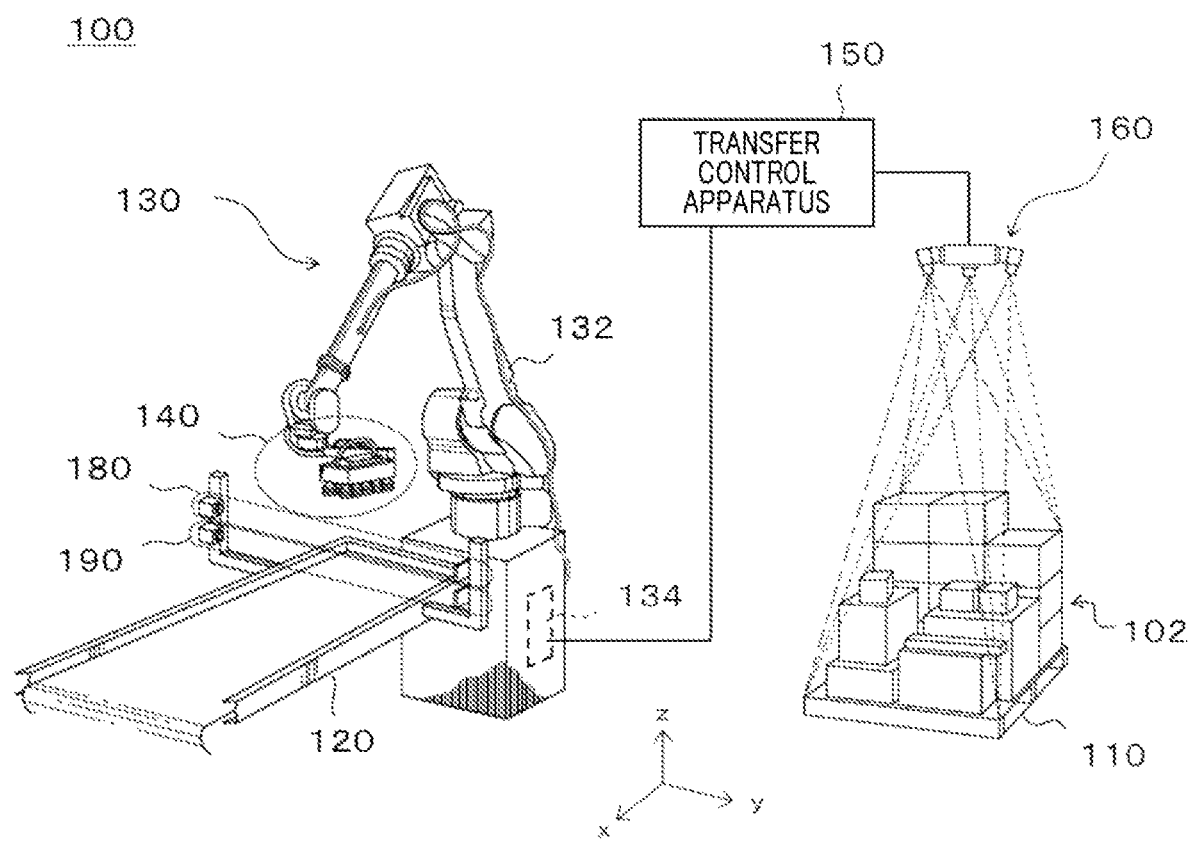
FIG. 1 schematically shows an example of a system configuration of a transfer system 100.

Hereinafter, some embodiments of the present invention will be described. The embodiments do not limit the invention according to the claims, and all the combinations of the features described in the embodiments are not necessarily essential to means provided by aspects of the invention. In the drawings, identical or similar portions are given the same reference numerals, and redundant descriptions may be omitted.

[Outline of the Transfer System 100]

FIG. 1 schematically shows an example of a system configuration of a transfer system 100. In the present embodiment, the transfer system 100 can include one or more depalletizing platforms 110, one or more reception platforms 120, one or more robots 130, a transfer control apparatus 150, and one or more image capturing apparatuses 160, for example. In the present specification, the term "one or more" means "one or a plurality".

In the present embodiment, the reception platform 120 can include a sensor 180 and a sensor 190 for detecting a package 102 (also sometimes referred to as a workpiece) gripped by a robot 130, for example. In the present embodiment, the robot 130 can include a robot arm 132, a drive control unit 134, and an end effector 140, for example.

Each unit of the transfer system 100 may transmit and receive information to and from another unit of the transfer system 100, via a communication network. In the present embodiment, the communication network may be a transmission path for wired communication, a transmission path for wireless communication, or a combination of a transmission path for wired communication and a transmission path for wireless communication. The communication network may include a wireless packet communication network, the Internet, a P2P network, a dedicated line, a VPN, a power line communication line, or the like. The communication network may include (i) a mobile communication network such as a mobile telephone network or (ii) a wireless communication network such as wireless MAN (e.g. WiMAX (registered trademark)), wireless LAN (e.g. WiFi (registered trademark)), Bluetooth (registered trademark), Zigbee (registered trademark), or NFC (Near Field Communication).

In the present embodiment, the transfer system 100 can transfer a package 102 from the depalletizing platform 110 to the reception platform 120. As an example, the transfer system 100 can use the robot 130 to transfer one or more packages 102 mounted on the depalletizing platform 110 to the reception platform 120, one at a time.

The package 102 may be a packaging material used for packaging products or a packaging material used to provide a service. The package 102 may be a box-shaped packaging material. A single product or item, or a plurality of products or items, may be placed inside the package 102.

In one embodiment, packaging materials with the same or similar outer appearances are used to wrap products of the same type. Furthermore, packaging materials with the same or similar outer appearances are used to provide services of the same type. In another embodiment, as an example, there are cases where the types of items contained in two packaging materials with the same or similar outer appearances are different from each other, as a result of the packaging materials being reused.

In the present embodiment, the transfer system 100 can perform a registration process, a planning process, and a transport process, relating to the transfer of the packages 102. In the present embodiment, the transfer system 100 can perform the registration process for a package that has not yet been registered while the robot arm 132 transfers this unregistered package 102 from the depalletizing platform 110 to the reception platform 120.

In the present embodiment, the transfer system 100 may omit the registration process for packages 102 that have already been registered. It is possible for there to be a discrepancy between the registered data and the actual measured data, while the robot arm 132 can transfer a registered package 102 from the depalletizing platform 110 to the reception platform 120. In such a case, the transfer system 100 may update the data of this registered package 102 while this registered package 102 is being transferred.

In the registration process, the transfer system 100 can register a characteristic of the package 102 in a database. Examples of the characteristic of the package 102 include dimensions, a shape, a feature of the outer appearance, mass, position of the center of mass, a grip position, a grip state, and the like. Examples of the feature of the outer appearance include a character, symbol, code, image, illustration, pattern, and the like applied to the outer appearance. The position of the center of mass of a package 102 may be a relative position between a reference position of the package 102 and the center of mass of the package 102.

In the planning process, the transfer system 100 can determine a package 102 (as described above, sometimes referred to as a workpiece) to be the target of the transfer process, among one or more packages 102 arranged on the depalletizing platform 110. Furthermore, the transfer system 100 can plan at least one of a trajectory path of a wrist portion (also sometimes referred to as a distal end) of the robot arm 132 and a trajectory path of the end effector 140, in relation to the transfer of a workpiece. As an example, the transfer system 100 can plan the trajectory path from when the robot 130 grips a workpiece arranged on the depalletizing platform 110 to when the robot 130 transfers this workpiece on the reception platform 120.

The trajectory path can show the change over time of the position and posture of the wrist portion of the robot 130 or the end effector 140. In one embodiment, the trajectory path can be expressed by information representing a plurality of timings and information representing the angle of each of a plurality of joints included in the robot arm 132 at each timing. The information representing the plurality of timings may be information representing the time from when the workpiece passes a reference position. The information representing the angle of each of the plurality of joints may be information directly representing the angle of each joint, or may be information indirectly representing the angle of each joint. Examples of the information indirectly representing the angle of each joint can include information representing the position and posture of the wrist portion of the robot 130 or the end effector 140, information representing the output of a motor for setting the angle of each joint to a specified value, and the like.

In the transport process, the transfer system 100 can control the operation of the robot 130 such that the wrist portion of the robot arm 132 or the end effector 140 can move along the trajectory path planned in the planning process. The transport process can include a drawing near step, a gripping step, a lifting step, a movement step, a placement step, and a release step, for example.

In the drawing near step, the robot arm 132 can bring the end effector 140 near the workpiece arranged on the depalletizing platform 110. In the gripping step, the end effector 140 can grip the workpiece. In the lifting step, the robot arm 132 can lift up the workpiece gripped by the end effector 140. In the movement step, the robot arm 132 can move the workpiece gripped by the end effector 140 to be above the reception platform 120. In the placement step, the robot arm 132 can place the workpiece gripped by the end effector 140 onto the reception platform 120. In the release step, the end effector 140 can release the workpiece.

In the present embodiment, the transfer system 100 can detect an abnormality relating to the transport of a workpiece. The transfer system 100 may detect the abnormality relating to the transport of the workpiece based on measured values of the mass and center of mass of the workpiece. In this way, the transfer system 100 can quickly and accurately detect the abnormality relating to the transport of the workpiece. If an abnormality relating to the transport of the workpiece is detected, the transfer system 100 may adjust the movement velocity of the workpiece or stop the transport process of the workpiece.

Examples of abnormalities relating to the transport of the workpiece can include at least one of failure to identify the workpiece, failure to grip the workpiece, excessive pressing of the workpiece, dropping of the workpiece, damage of the workpiece, and a collision involving the workpiece. Examples of a failure to identify the workpiece can include an incorrect judgment of an edge of the workpiece, an incorrect identification of a characteristic of the workpiece, and the like. Examples of an incorrect identification of a characteristic of the workpiece can include an error in the image recognition of the outer appearance of the workpiece, an error in the information registered in the database used to identify the workpiece, and the like.

As an example, when a characteristic of the workpiece is identified based on a feature of the outer appearance of the workpiece, the transfer system 100 can first judge the edge of the workpiece by analyzing an image of the workpiece. Next, the transfer system 100 can extract the feature of the outer appearance of the workpiece by analyzing the image of the workpiece. For each product or service, the transfer system 100 can access a database in which the feature of the outer appearance of the package used for this product or service and the characteristic of this package can be associated with each other, and can acquire the information representing the characteristic of a package matching the extracted feature. In this case, if the edge of the workpiece cannot be correctly judged, if the feature of the outer appearance of the workpiece cannot be correctly extracted, or if there is an error in the content of the database, the characteristic of the workpiece may not be identified correctly.

Examples of failure to grip the workpiece can include a case where the workpiece grip position is inappropriate, a case where the workpiece grip strength is insufficient, and the like. Examples of excessive pressing of the workpiece can include (i) a case where the end effector 140 presses the workpieces excessively due to an error in a setting relating to the height of the end effector 140 in the workpiece gripping step, (ii) a case where the end effector 140 presses the workpieces excessively due to an error in a setting concerning the height of the end effector 140 in the workpiece release step, (iii) a case where the end effector 140 presses the workpieces excessively due to an error in the database relating to the height of the workpiece, and the like.

Examples of dropping the workpiece can include dropping the entire workpiece, dropping a portion of the workpiece, and the like. Damage of the workpiece can include excessive deformation of the shape of the workpiece, separation of a portion of the workpiece, excessive change in the arrangement of items contained in the workpiece, and the like. Examples of a collision involving the workpiece can include a collision between the workpiece and the reception platform 120, a collision between the workpiece and another workpiece, and the like.

[Outline of Each Component of the Transfer System 100]

In the present embodiment, the depalletizing platform 110 can have one or more packages 102 mounted thereon. The depalletizing platform 110 may be a palette.

In the present embodiment, the reception platform 120 can transport, to a predetermined destination, the packages 102 which are taken out from the depalletizing platform 110 and placed on the reception platform 120 by the robot 130. The reception platform 120 may be a conveyor. The reception platform 120 may include one or more conveyors.

In the present embodiment, the robot 130 can perform a transport process for the package 102. The details of each unit of the robot 130 are described further below.

In the present embodiment, the robot arm 132 may include a manipulator. This manipulator may be a multi-jointed manipulator.

In the present embodiment, the drive control unit 134 can control the operation of the robot arm 132 and the end effector 140. The drive control unit 134 may control the operation of the robot arm 132 and the end effector 140 in accordance with instructions from the transfer control apparatus 150. The drive control unit 134 may acquire the outputs of one or more sensors arranged on the robot arm 132. The drive control unit 134 may acquire the outputs of one or more sensors arranged on the end effector 140. The drive control unit 134 may transmit the outputs of the sensors described above to the transfer control apparatus 150.

In the present embodiment, the end effector 140 can grip and release the packages 102. For example, the end effector 140 can grip a package 102 arranged on the depalletizing platform 110. The end effector 140 can grip the package 102 until the package 102 has been transported to a predetermined position above the reception platform 120. After this, the end effector 140 can release the package 102.

In the present embodiment, the transfer control apparatus 150 can monitor the state of each unit of the transfer system 100. Furthermore, the transfer control apparatus 150 can control the operation of each unit of the transfer system 100. The details of the transfer control apparatus 150 are described further below.

In the present embodiment, the image capturing apparatus 160 can capture an image of the depalletizing platform 110 and output image data of the depalletizing platform 110 to the transfer control apparatus 150. The image capturing apparatus 160 may be arranged above the depalletizing platform 110. In this way, the transfer control apparatus 150 can acquire image data of the top surface of the package 102 mounted on the depalletizing platform 110.

The image capturing apparatus 160 may include a plurality of cameras or sensors that are each arranged at a different position. Each of these cameras or sensors may output, by itself, a two-dimensional image, three-dimensional image, or distance image (sometimes referred to as a point group) of a subject. The image capturing apparatus 160 may process the outputs of the plurality of cameras or sensors, and output a three-dimensional image or distance image (sometimes to referred to as a point group) of the subject. The image may be a still image or a moving image.

In the present embodiment, the details of the transfer system 100 are described using an example of a case where the image capturing apparatus 160 captures an image of the depalletizing platform 110. However, the subject of the image capturing apparatus 160 is not limited to the present embodiment. In another embodiment, the image capturing apparatus 160 can capture an image of the depalletizing platform 110 and the reception platform 120. The image capturing apparatus 160 may capture an image of the entire depalletizing platform 110.

In the present embodiment, the sensor 180 can be used to detect the height of the workpiece. As long as the sensor 180 is a sensor that can detect the presence or lack of an object, the details thereof are not particularly limited. The sensor 180 may be a non-contact type of object detection sensor that uses light, a laser, ultrasonic waves, or the like. The sensor 180 may be a contact type of object detection sensor.

As an example, the robot 130 can slowly lower the workpiece after lifting this workpiece to a prescribed height above the sensor 180. During this time, the robot 130 can output the information representing the position and posture of the end effector 140 to the transfer control apparatus 150. When the sensor 180 detects the presence of a workpiece, the sensor 180 can output information representing that the workpiece has been detected to the transfer control apparatus 150.

The transfer control apparatus 150 can store information representing a relative positional relationship between the end effector 140 and the top surface of the workpiece, for example. In this way, the transfer control apparatus 150 can determine the position (e.g. the height from the floor surface) of the top surface of the workpiece, from the position and posture of the end effector 140. Furthermore, the transfer control apparatus 150 can store information representing the detection position (e.g. the height from the floor surface) of the sensor 180. In this way, the transfer control apparatus 150 can determine the position (e.g. the height from the floor surface) of the bottom surface of the workpiece. The transfer control apparatus 150 can calculate the height of the workpiece based on the position of the bottom surface of the workpiece and the position of the top surface of the workpiece.

In the present embodiment, the sensor 190 can be used to determine a timing at which the end effector 140 releases the workpiece. As long as the sensor 190 is a sensor that can detect the presence or lack of an object, the details thereof are not particularly limited. The sensor 190 may be a non-contact type of object detection sensor that uses light, a laser, ultrasonic waves, or the like. The sensor 190 may be a contact type of object detection sensor.

[Detailed Configuration of Each Unit of the Transfer System 100]

Each unit of the transfer system 100 may be realized by hardware, by software, or by both hardware and software. At least part of each unit of the transfer system 100 may be realized by a single server or by a plurality of servers. At least part of each unit of the transfer system 100 may be realized on a virtual machine or a cloud system. At least part of each unit of the transfer system 100 may be realized by a personal computer or a mobile terminal. The mobile terminal can be exemplified by a mobile telephone, a smart phone, a PDA, a tablet, a notebook computer or a laptop computer, a wearable computer, or the like. Each unit of the transfer system 100 may store information, using a distributed network or distributed ledger technology such as block chain.

If at least some of the components forming the transfer system 100 are realized by software, these components realized by software may be realized by starting up a program in which operations corresponding to these components are defined, with an information processing apparatus having a general configuration. The information processing apparatus having the general configuration described above includes, for example, (i) a data processing apparatus having a processor such as a CPU or a GPU, a ROM, a RAM, a communication interface, and the like, (ii) an input apparatus such as a keyboard, a touch panel, a camera, a microphone, various sensors, or a GPS receiver, (iii) an output apparatus such as a display apparatus, a speaker, or a vibration apparatus, and (iv) a storage apparatus (including an external storage apparatus) such as a memory or an HDD.

In the information processing apparatus having the general configuration described above, the data processing apparatus or the storage apparatus described above may store a program. The program may be stored in a non-transitory computer readable storage medium. The program can cause the information processing apparatus described above to perform the operations defined by this program, by being executed by the processor.

The program may be stored in a non-transitory computer readable storage medium. The program may be stored in a computer readable medium such as a CD-ROM, a DVD-ROM, a memory, or a hard disk, or may be stored in a storage apparatus connected to a network. The program may be installed in a computer forming at least part of the transfer system 100, from the computer readable medium or the storage apparatus connected to the network. The computer may be caused to function as at least a portion of each unit of the transfer system 100, by executing the program.

The program that causes the computer to function as at least a portion of each unit of the transfer system 100 may include modules in which the operations of the units of the transfer system 100 are defined. This program or these modules can act on the data processing apparatus, the input apparatus, the output apparatus, the storage apparatus, and the like to cause the computer to function as each unit of the transfer system 100 and to cause the computer to perform the information processing method in each unit of the transfer system 100.

By having the computer read this program, the information processes described in the program can function as the specific means realized by the cooperation of software relating to these programs and various hardware resources of some or all of the transfer system 100. These specific means can realize computation or processing of the information corresponding to an intended use of the computer in the present embodiment, thereby forming the transfer system 100 corresponding to this intended use.

The above program may be a program that causes a computer to function as the transfer control apparatus 150. The above program may be a program that causes a computer to perform the information processing method of the transfer control apparatus 150.

The transfer system 100 may be an example of a transport apparatus. The package 102 may be an example of an item and a target item. The robot 130 may be an example of the transport apparatus. The robot arm 132 may be an example of a manipulator. The drive control unit 134 may be an example of a force sensation information acquiring unit, an angle information acquiring unit, and a depressurization information acquiring unit. The end effector 140 may be an example of a gripping unit. The transfer control apparatus 150 may be an example of a control apparatus. The image capturing apparatus 160 may be an example of an image information acquiring unit. The workpiece may be an example of a target item. The package 102 that is a target of the transfer process may be an example of a target item.

Figure 2:
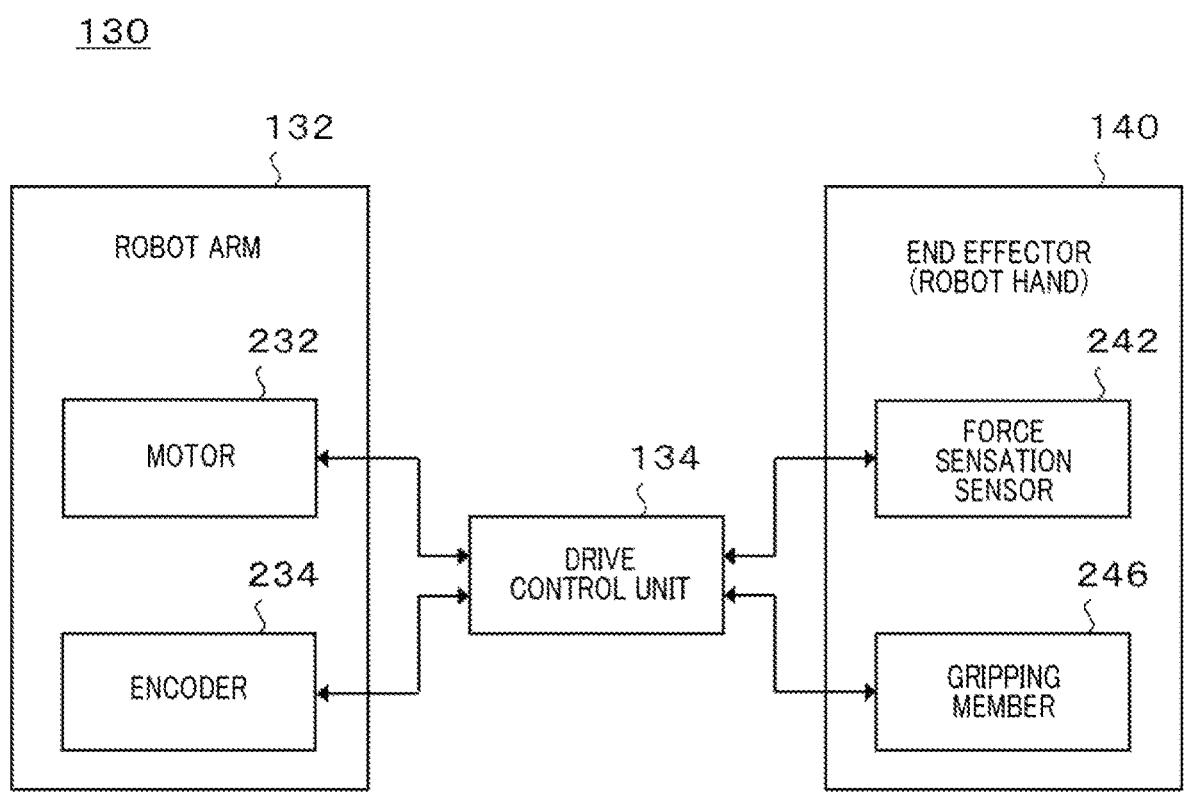
FIG. 2 schematically shows an example of a system configuration of the robot 130.

FIG. 2 schematically shows an example of a system configuration of the robot 130. As shown in FIG. 2, in the present embodiment, the robot 130 can include the robot arm 132, the end effector 140 attached to the distal end of the robot arm 132, and the drive control unit 134 that controls the robot arm 132 and the end effector 140. In the present embodiment, the robot arm 132 can include a plurality of motors 232 and a plurality of encoders 234. In the present embodiment, the end effector 140 can include a force sensation sensor 242 and a gripping member 246.

In the present embodiment, each of the plurality of motors 232 can adjust the angle of a respective one of the plurality of joints included in the robot arm 132. Each of the plurality of motors 232 may adjust the angle of the corresponding joint according to instructions from the drive control unit 134. Each of the plurality of motors 232 may output information representing a current value (sometimes referred to as current information) to the drive control unit 134. Each of the plurality of motors 232 may output the current information, in which information representing a timing and information representing the current value at this timing are associated with each other, to the drive control unit 134.

In the present embodiment, each of the plurality of encoders 234 can output information representing the angle of a respective one of the plurality of joints included in the robot arm 132 (sometimes referred to as angle information) to the drive control unit 134. Each of the plurality of encoders 234 may output the angle information, in which information representing a timing and information representing the angle of the corresponding joint at this timing are associated with each other, to the drive control unit 134.

In the present embodiment, the force sensation sensor 242 can be arranged between the distal end of the robot arm 132 and the gripping member 246. The force sensation sensor 242 can output information representing the magnitude of at least one of the force and the torque at the distal end of the robot arm 132 (sometimes referred to as force sensation information). The force sensation sensor 242 may output the force sensation information in which information representing a timing and information representing the magnitude of the at least one of the force and the torque at this timing are associated with each other. The force sensation sensor 242 may output the force sensation information representing the magnitude and direction of at least one of the force and the torque at the distal end of the robot arm 132. The force sensation sensor 242 may output the force sensation information in which information representing a timing and information representing the magnitude and direction of the at least one of the force and the torque at this timing are associated with each other.

For example, the force sensation information can include information representing the magnitude of the force in the x-direction, the magnitude of the force in the y-direction, and the magnitude of the force in the z-direction. The force sensation information may include information representing the magnitude of the torque in the x-direction, the magnitude of the torque in the y-direction, and the magnitude of the torque in the z-direction. The force sensation information may include information representing the magnitude of the force in the x-direction, the magnitude of the force in the y-direction, the magnitude of the force in the z-direction, the magnitude of the torque in the x-direction, the magnitude of the torque in the y-direction, and the magnitude of the torque in the z-direction. The coordinate system is not limited to the detailed example above.

In the present embodiment, the gripping member 246 can grip the package 102 that is to be the transport target. The gripping member 246 can include a mechanism capable of gripping and releasing the package 102, according to instructions from the drive control unit 134, and the details thereof are not particularly limited. The gripping member 246 may grip the package 102 by sandwiching the package 102, or may grip the package 102 by adhering the package 102 thereto. The details of the gripping member 246 are described further below.

Figure 3:
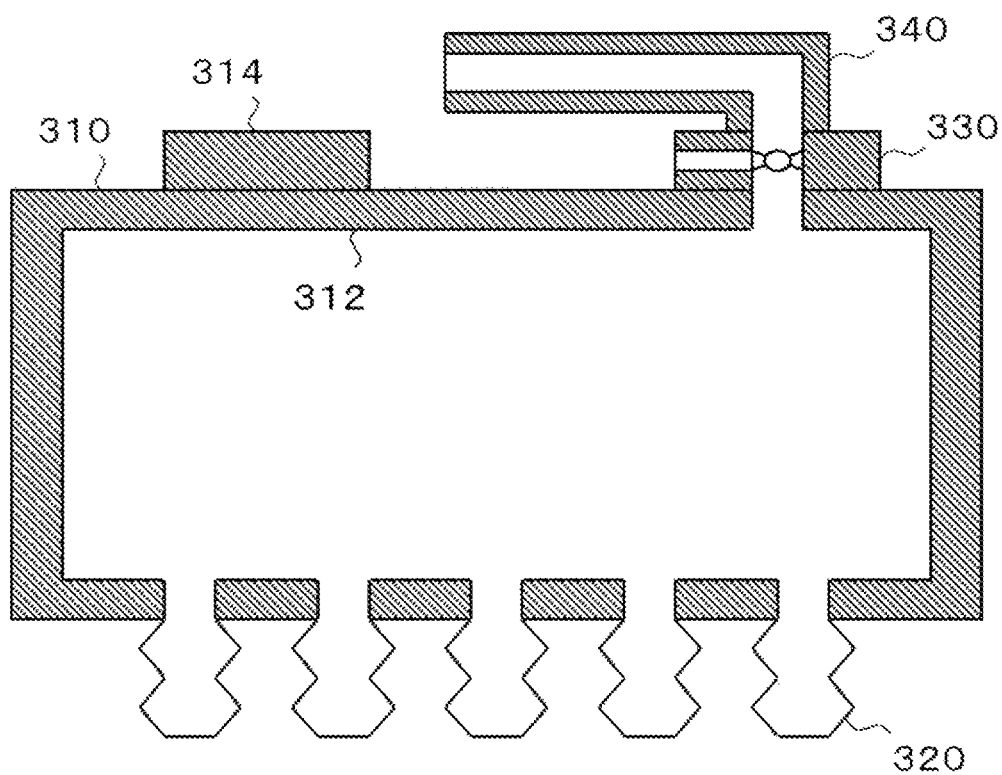
FIG. 3 schematically shows an example of the gripping member 246.

FIG. 3 schematically shows an example of the gripping member 246. In the present embodiment, the gripping member 246 can include a main body 310, an adhesion pad 320, a valve 330, and an intake pipe 340. In the present embodiment, a depressurization chamber 312 can be formed inside the main body 310. A connection member 314 can be arranged outside the main body 310.

In the present embodiment, the main body 310 can be attached to the distal end of the robot arm 132, via the force sensation sensor 242. The depressurization chamber 312 can be connected to an external depressurization source, via the valve 330 and the intake pipe 340. The connection member 314 can connect the main body 310 and the force sensation sensor 242.

The adhesion pad 320 can be attached to the main body 310 in a manner to protrude from the main body 310. The adhesion pad 320 can have a hollow shape, for example. The adhesion pad 320 can be attached to the main body 310 in a manner to realize communication between the inside of the adhesion pad 320 and the inside of the depressurization chamber 312. The adhesion pad 320 can contact the package 102 and adhere the package 102 thereto, using a pressure difference between the inside and the outside of the adhesion pad 320.

In the present embodiment, the valve 330 can adjust the pressure inside the depressurization chamber 312. The valve 330 may operate according to instructions from the drive control unit 134. For example, the valve 330 can cause a reduction in the pressure inside the depressurization chamber 312 by causing communication between the depressurization chamber 312 and the intake pipe 340. The valve 330 may cause an increase in the pressure inside the depressurization chamber 312 by opening the depressurization chamber 312 to the outside atmosphere.

In the present embodiment, one end portion of the intake pipe 340 can be connected to the external depressurization source. The other end portion of the intake pipe 340 can be connected to the depressurization chamber 312 via the valve 330. Therefore, the intake pipe 340 can suck out the air that is inside the depressurization chamber 312.

Figure 4:
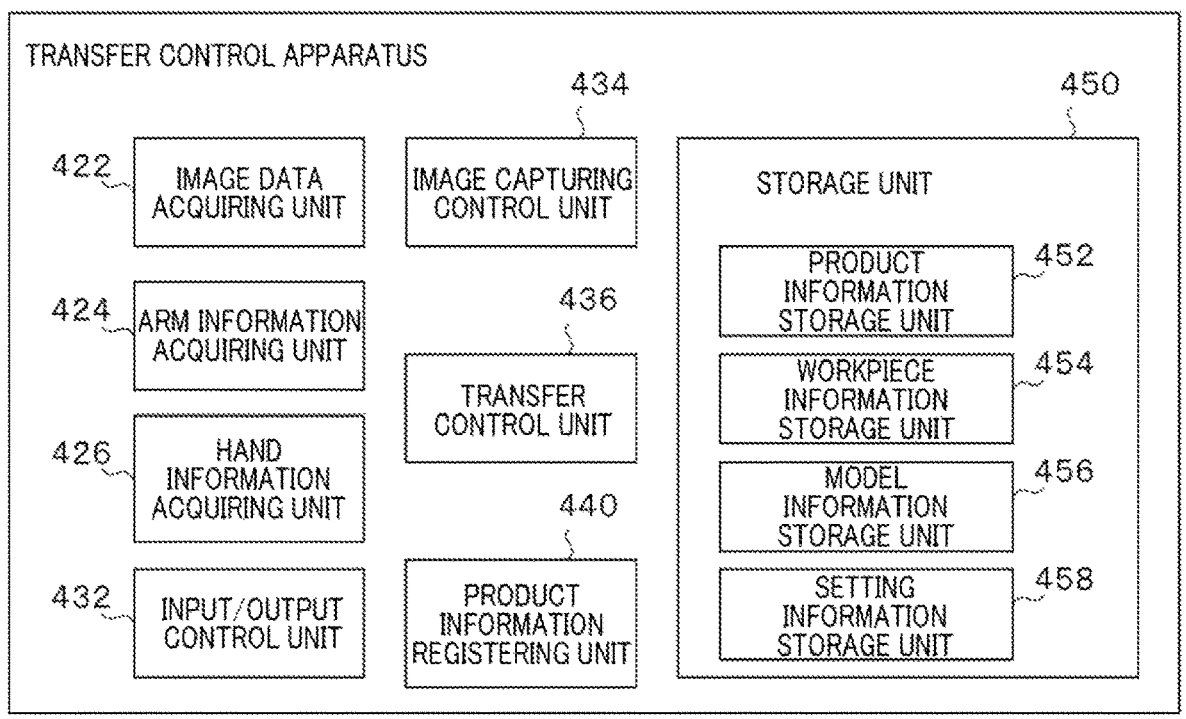
FIG. 4 schematically shows an example of an internal configuration of the transfer control apparatus 150.

FIG. 4 schematically shows an example of an internal configuration of the transfer control apparatus 150. In the present embodiment, the transfer control apparatus 150 can include an image data acquiring unit 422, an arm information acquiring unit 424, a hand information acquiring unit 426, a input/output control unit 432, an image capturing control unit 434, a transfer control unit 436, a product information registering unit 440, and a storage unit 450. In the present embodiment, the storage unit 450 can include a product information storage unit 452, a workpiece information storage unit 454, a model information storage unit 456, and a setting information storage unit 458.

In the present embodiment, the image data acquiring unit 422 can acquire the image data output by the image capturing apparatus 160. For example, the image data acquiring unit 422 can acquire the image data of the package 102 at a point in time before the package 102 that is to be the transport target is gripped by the robot 130. The image data acquiring unit 422 may output the acquired image data to the transfer control unit 436.

In the present embodiment, the arm information acquiring unit 424 can acquire information concerning the robot arm 132. The arm information acquiring unit 424 may acquire information concerning the state of the robot arm 132 during an interval in which the package 102 is being transported. For example, the arm information acquiring unit 424 can acquire the outputs of the one or more sensors arranged in the robot arm 132. The arm information acquiring unit 424 may acquire at least one of the angle information and the current information concerning the robot arm 132. The arm information acquiring unit 424 may output the acquired information to the transfer control unit 436.

In the present embodiment, the hand information acquiring unit 426 can acquire information concerning the end effector 140. The hand information acquiring unit 426 may acquire information concerning the state of the end effector 140 during an interval in which the package 102 is being transported. For example, the hand information acquiring unit 426 can acquire the outputs of the one or more sensors arranged on the end effector 140. The hand information acquiring unit 426 may acquire the force sensation information concerning the end effector 140. The hand information acquiring unit 426 may acquire information representing the magnitude of the pressure inside the depressurization chamber 312 (sometimes referred to as the depressurization information). The hand information acquiring unit 426 may acquire information representing an open/closed state of the valve 330. The hand information acquiring unit 426 may output the acquired information to the transfer control unit 436.

In the present embodiment, the input/output control unit 432 can control the input to and output from the transfer system 100. For example, the input/output control unit 432 can control the input of information from a user or another information processing apparatus to the transfer system 100. The input/output control unit 432 may control the output of information from the transfer system 100 to a user or another information processing apparatus. The input/output control unit 432 may control the input and output of information between the robot 130, the transfer control apparatus 150, and the image capturing apparatus 160. In the present embodiment, the image capturing control unit 434 can control the image capturing apparatus 160. In the present embodiment, the transfer control unit 436 can control at least one of the reception platform 120 and the robot 130. The details of the transfer control unit 436 are described further below.

In the present embodiment, the product information registering unit 440 can register the information concerning the package 102 that is to be a target of the transport process by the robot 130, in the product information storage unit 452. The product information registering unit 440 may register information representing the characteristic of the package 102 in the product information storage unit 452.

For example, the product information registering unit 440 can acquire information representing the characteristic of the workpiece from the transfer control unit 436. As described above, examples of the characteristic of the workpiece can include dimensions, shape, a feature of the outer appearance, mass, position of the center of mass, a grip position, a grip state, and the like. Next, the product information registering unit 440 can access the product information storage unit 452 and judges whether a product matching the feature of the outer appearance of the workpiece is already registered in the product information storage unit 452. If it is judged that a product that matches the feature of the outer appearance of the workpiece is not yet registered in the product information storage unit 452, the product information registering unit 440 can create a record concerning a new product and registers information representing the characteristic of the workpiece.

In the present embodiment, the storage unit 450 can store each type of information. The storage unit 450 may store the information to be used in the information processing in the transfer control apparatus 150. The storage unit 450 may store information generated by the information processing in the transfer control apparatus 150. The storage unit 450 may, in response to a request from any unit of the transfer system 100, extract information that matches a condition included in this request and output the extracted information as a response to the request.

In the present embodiment, for each product or service, the product information storage unit 452 can store the feature of the outer appearance of the package 102 to be used for this product or service and another characteristic concerning the package 102, in association with each other. Examples of the other characteristics concerning the package 102 can include the dimensions, shape, mass, position of the center of mass, grip position, grip state, and the like.

In the present embodiment, the workpiece information storage unit 454 can store each type of information concerning the package 102 that is currently to be the target of the transport process by the robot 130 (sometimes referred to as workpiece information). Examples of the workpiece information can include information concerning the dimensions, shape, mass, position of the center of mass, grip position, grip state, and the like.

The planar dimensions of the workpiece can be determined based on the image of the workpiece acquired by the image data acquiring unit 422, for example. The height of the workpiece can be determined based on the position and posture of the robot arm 132 acquired by the arm information acquiring unit 424 and the output of the sensor 180, for example. The mass and the center of mass of the workpiece can be determined based on the output of the force sensation sensor 242 acquired by the hand information acquiring unit 426. The grip position and the grip state of the workpiece can be determined based on the image of the workpiece acquired by the image data acquiring unit 422, for example. The grip position and the grip state of the workpiece may be determined based on the image of the workpiece acquired by the image data acquiring unit 422 and the output of the force sensation sensor 242 acquired by the hand information acquiring unit 426. The grip state of the workpiece may be determined or corrected based on the pressure inside the depressurization chamber 312, which is acquired by the hand information acquiring unit 426.

In the present embodiment, the model information storage unit 456 can store a three-dimensional model of each unit of the transfer system 100. For example, the model information storage unit 456 can store a three-dimensional model of the reception platform 120. The model information storage unit 456 may store a three-dimensional model of the robot 130. The model information storage unit 456 may store a three-dimensional models of one or more packages 102 mounted on the depalletizing platform 110. The three-dimensional model of a package 102 may be created based on the image data output by the image capturing apparatus 160. The model information storage unit 456 may store a three-dimensional models of objects (sometimes referred to as obstacles) arranged inside an action radius of the robot 130 and in the vicinity of the action radius. The three-dimensional models described above may be relatively precise models, or may be simplified models.

The setting information storage unit 458 can store information indicating the content of various setting relating to each unit of the transfer system 100. The setting information storage unit 458 may store information relating to an amount of mass that is transportable by the end effector 140. This transportable mass may be a rated transportable mass of the end effector 140, or may be a maximum transportable mass possible within the prescribed range of a transport velocity or a transport acceleration. The setting information storage unit 458 may store information representing the rated output of the robot 130. The setting information storage unit 458 may store information representing a setting value relating to an upper limit of the output of the robot 130. The setting information storage unit 458 may store information representing a setting value relating to an upper limit of a transport velocity or a transport acceleration of the robot 130.

The setting information storage unit 458 may store information relating to a communication delay between the robot 130 and the transfer control apparatus 150. The setting information storage unit 458 may store information representing the length of a delay time from when the encoder 234 outputs data to when the transfer control apparatus 150 acquires this data. The setting information storage unit 458 may store information representing the length of a delay time from when the force sensation sensor 242 outputs data to when the transfer control apparatus 150 acquires this data. The setting information storage unit 458 may store information representing threshold values to be used for various judgments, and may store information representing the content of conditions to be used for various judgments.

The image data acquiring unit 422 may be an example of an image information acquiring unit. The arm information acquiring unit 424 may be an example of an angle information acquiring unit. The hand information acquiring unit 426 may be an example of a force sensation information acquiring unit and a depressurization information acquiring unit. The transfer control unit 436 may be an example of a control apparatus.

Figure 5:
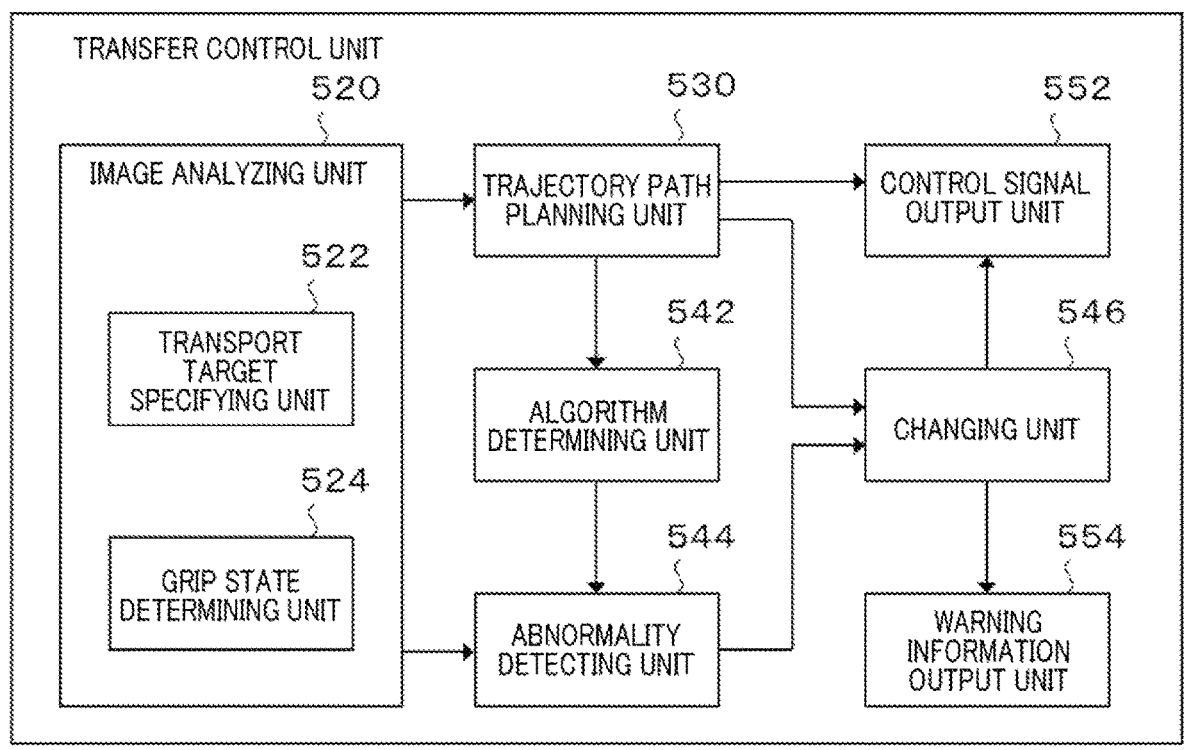
FIG. 5 schematically shows an example of an internal configuration of the transfer control unit 436.

FIG. 5 schematically shows an example of an internal configuration of the transfer control unit 436. In the present embodiment, the transfer control unit 436 can include an image analyzing unit 520, a trajectory path planning unit 530, an algorithm determining unit 542, an abnormality detecting unit 544, a changing unit 546, a control signal output unit 552, and a warning information output unit 554. In the present embodiment, the image analyzing unit 520 can include a transport target specifying unit 522 and a grip state determining unit 524.

In the present embodiment, the image analyzing unit 520 can receive the image data from the image data acquiring unit 422. For example, the image analyzing unit 520 can acquire the image data of an image obtained by the image capturing apparatus 160 capturing images, from above, of one or more packages 102 arranged on the depalletizing platform 110. The image analyzing unit 520 can analyze this image data. The image analyzing unit 520 can output information representing the analysis results to the trajectory path planning unit 530 and the abnormality detecting unit 544, for example.

In the present embodiment, the transport target specifying unit 522 can analyze the image and specifies a package 102 to be the target of the transport process, from among one or more packages 102 included in the image. For example, the transport target specifying unit 522 can extract a border (sometimes referred to as an edge) between two packages 102 from the image, and estimate the contour of each of one or more packages 102 included in the image. The transport target specifying unit 522 can extract a region that matches the feature of the outer appearance of a package 102 that is already registered, from the image, and estimate the type of each of one or more packages 102 included in the image.

In a case where there is a package 102 for which both the contour and the type have been recognized using the above process, the transport target specifying unit 522 can select one of these one or more packages for which the contour and type have been recognized, as the target of the transport process. The transport target specifying unit 522 may store, in the workpiece information storage unit 454, identification information of a product or service corresponding to the package 102 (sometimes referred to as a workpiece) selected as the target of the transport process.

In a case where there is a package 102 for which the contour has been recognized using the above process but there is no package 102 for which both the contour and the type have been recognized, the transport target specifying unit 522 may select one of the one or more packages for which the contour has been recognized using the above process, as the target of the transport process. The transport target specifying unit 522 may store, in the workpiece information storage unit 454, information representing a position of the package 102 (sometimes referred to as a workpiece) selected as the target of the transport process. For example, the transport target specifying unit 522 can store, in the workpiece information storage unit 454, information representing the relative positions of a reference point of the workpiece and a reference point of the depalletizing platform 110.

In the present embodiment, the transport target specifying unit 522 may access the product information storage unit 452 and acquire the characteristic of a package that matches the feature of the outer appearance of the workpiece. In this way, the transport target specifying unit 522 can estimate various characteristics relating to the workpiece, based on the image data described above. For example, the transport target specifying unit 522 can estimate at least one of the dimensions, shape, mass, and position of the center of mass of the workpiece. The transport target specifying unit 522 may store, in the workpiece information storage unit 454, the information representing various characteristics relating to the workpiece that have been estimated.

In the present embodiment, the transport target specifying unit 522 may specify the position of a geometric center of the top surface of the workpiece, based on the image data described above. The transport target specifying unit 522 may store, in the workpiece information storage unit 454, information representing the specified position of the geometric center.

In the present embodiment, the grip state determining unit 524 can determine the grip position at which the workpiece is gripped by the end effector 140. For example, the grip state determining unit 524 can determine a positional relationship between a reference point of the end effector 140 and a reference point of the workpiece. The grip state determining unit 524 may store, in the workpiece information storage unit 454, information representing the grip position at which the workpiece is gripped by the end effector 140.

The grip state determining unit 524 may make a determination to grip the workpiece with the end effector 140 such that the center of the end effector 140 and the center of mass of the workpiece match. On the other hand, in a case where there is not enough space around the workpiece and the end effector 140 cannot be arranged such that the center of the end effector 140 matches the center of mass of the workpiece, the grip state determining unit 524 may judge whether it is possible to arrange the end effector 140 around the workpiece. For example, the grip state determining unit 524 may judge whether it is possible to arrange the end effector 140 around the workpiece by using a three-dimensional model of the end effector 140 and the robot arm 132 and a three-dimensional model of one or more packages 102 mounted on the depalletizing platform 110.

If the end effector 140 can be arranged around the workpiece, the grip state determining unit 524 may determine the grip position at which the workpiece is gripped by the end effector 140 based on the position and posture of the end effector 140 at this time. On the other hand, if the end effector 140 cannot be arranged around the workpiece, the grip state determining unit 524 may make a request to the transport target specifying unit 522 to select another package 102 as the workpiece.

The grip state determining unit 524 may determine the grip strength to be applied to the workpiece by the end effector 140. For example, the grip state determining unit 524 may determine the grip strength to be applied to the workpiece by the end effector 140 based on the grip position at which the workpiece is gripped by the end effector 140 and the arrangement of the adhesion pad 320 on the end effector 140.

In the present embodiment, the trajectory path planning unit 530 can plan at least one of a trajectory path of the distal end of the robot arm 132 and a trajectory path of the end effector 140. The trajectory path planning unit 530 can output information representing the content of the plan relating to the trajectory path described above (sometimes referred to as plan information) to at least one of the algorithm determining unit 542, the abnormality detecting unit 544, the changing unit 546, and the control signal output unit 552, for example. The trajectory path planning unit 530 may store the plan information in the workpiece information storage unit 454. The plan information may include information representing a plurality of elapsed times from when the workpiece passes a reference position in the trajectory path and information representing the angle of each of the plurality of joints included in the robot arm 132 at each elapsed time.

As an example, the trajectory path planning unit 530 can access the workpiece information storage unit 454 and acquires at least one of the information representing the position of the workpiece, the information representing various characteristics relating to the workpiece, the information representing the grip position of the workpiece, and the information indicating the grip strength of the workpiece. Furthermore, the trajectory path planning unit 530 can access the model information storage unit 456 and acquires the three-dimensional model of the robot 130 and the three-dimensional models of one or more packages 102 mounted on the depalletizing platform 110. The trajectory path planning unit 530 can access the setting information storage unit 458 and acquires various types of information relating to the settings of the robot 130. The trajectory path planning unit 530 can plan the trajectory path 600 described above using the information described above.

In the present embodiment, the algorithm determining unit 542 can determine an algorithm to be used by the abnormality detecting unit 544 to detect abnormalities. The algorithm determining unit 542 can output information relating to the determined algorithm to the abnormality detecting unit 544.

In one embodiment, the algorithm determining unit 542 can determine the algorithm described above for each step included in the transport process. As described above, the transport process can include the drawing near step, the gripping step, the lifting step, the movement step, the placement step, and the release step, for example. In another embodiment, the algorithm determining unit 542 can acquire the plan information from the trajectory path planning unit 530 and divides the trajectory path into a plurality of segments. The algorithm determining unit 542 may divide the trajectory path into the plurality of segments based on at least one of the magnitude of the transport velocity, the magnitude of the transport acceleration, and the amount of fluctuation in the transport acceleration. The algorithm determining unit 542 may divide the trajectory path into the plurality of segments based on at least one of the magnitude of the transport velocity in a substantially horizontal direction, the magnitude of the transport acceleration in the substantially horizontal direction, and the amount of fluctuation in the transport acceleration in the substantially horizontal direction. The algorithm determining unit 542 may determine the algorithm described above for each segment.

In the present embodiment, the abnormality detecting unit 544 can detect abnormalities relating to the transport of the workpiece. The details of the abnormality detecting unit 544 are described further below.

In the present embodiment, when the abnormality detecting unit 544 has detected an abnormality relating to the transport of the workpiece, the changing unit 546 can change various settings relating to the transport of this workpiece. The details of the changing unit 546 are described further below.

In the present embodiment, the control signal output unit 552 can acquire the plan information from the trajectory path planning unit 530. The transport target specifying unit 522 can generate a control signal for controlling the operation of the robot 130, based on the plan information. The transport target specifying unit 522 can transmit the generated control signal to the drive control unit 134.

When change information is acquired from the changing unit 546, the control signal output unit 552 can generate the control signal for controlling the operation of the robot 130, based on this change information. The control signal output unit 552 can transmit the generated control signal to the drive control unit 134.

In the present embodiment, when the abnormality detecting unit 544 has detected an abnormality relating to the transport of the workpiece, the warning information output unit 554 can provide a message indicating that an abnormality has been detected to an operator of the transfer control apparatus 150. Examples of an output aspect of this message can include output of a message screen, output of an audio message, and the like.

The image analyzing unit 520 may be an example of an image information acquiring unit. The transport target specifying unit 522 may be an example of an image information acquiring unit, a mass information acquiring unit, a center of mass estimating unit, and a geometric center identifying unit. The grip state determining unit 524 may be an example of an image information acquiring unit and a grip position determining unit. The abnormality detecting unit 544 may be an example of a control apparatus. The changing unit 546 may be an example of an adjusting unit. A value of the mass of a package stored in the product information storage unit 452 may be an example of a predetermined value serving as the mass of a target item.

Figure 6:
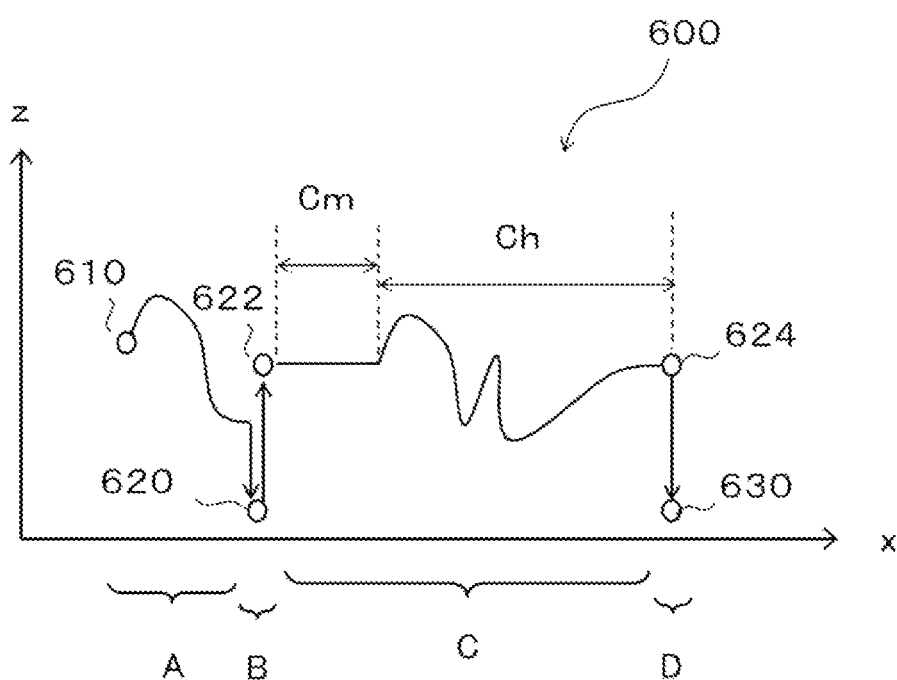
FIG. 6 schematically shows an example of a trajectory path of the gripping member 246.

FIG. 6 schematically shows an example of a trajectory path of the gripping member 246. In the present embodiment, the trajectory path 600 is divided into segment A, segment B, segment C, and segment D. Furthermore, segment C is divided into segment Cm that has a relatively small acceleration fluctuation and segment Ch that has a relatively large acceleration fluctuation. Segment A may be a trajectory path along which the end effector 140 moves from the standby position 610 to the grip position 620. Segment B may be a trajectory path along which the end effector 140 moves from the grip position 620 to the transport preparation position 622. Segment C may be a trajectory path along which the end effector 140 moves from the transport preparation position 622 to the placement preparation position 624. Segment D may be a trajectory path along which the end effector 140 moves from the placement preparation position 624 to the release position 630.

Figure 7:
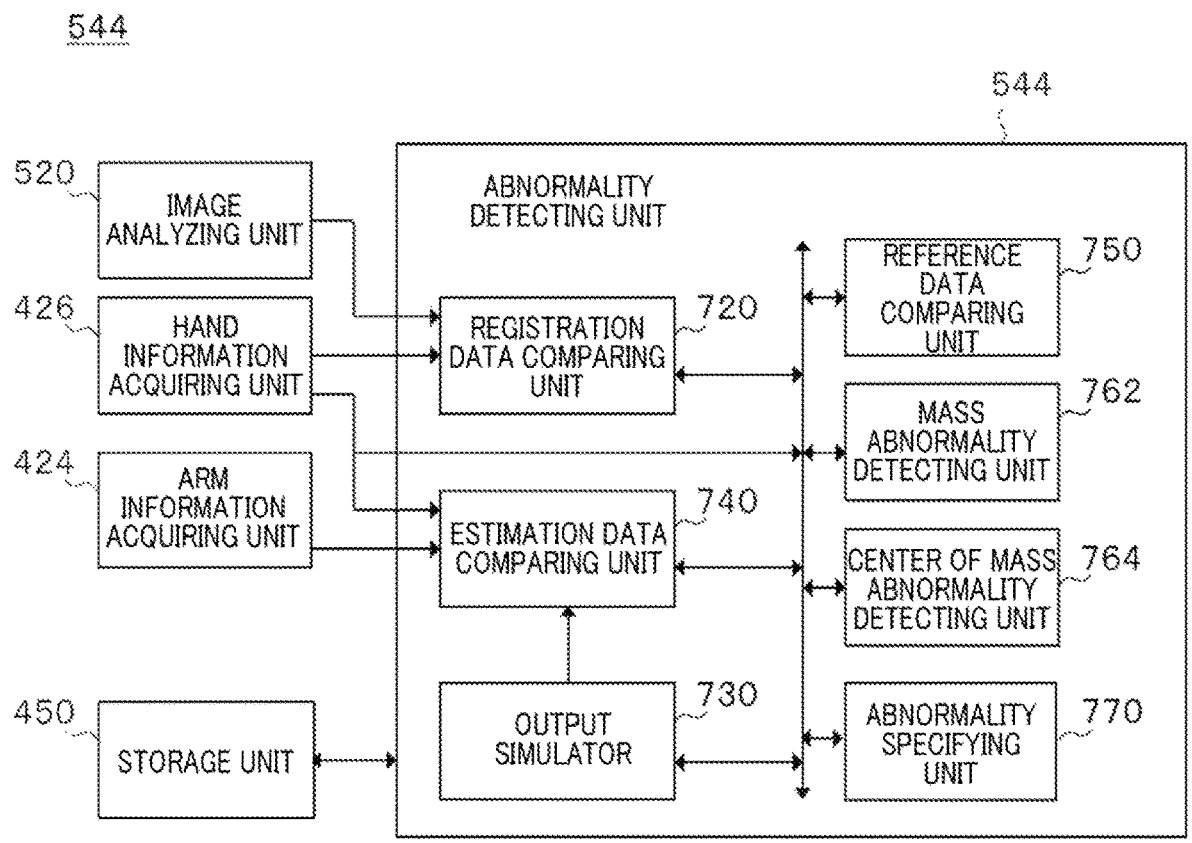
FIG. 7 schematically shows an example of an internal configuration of the abnormality detecting unit 544.

FIG. 7 schematically shows an example of an internal configuration of the abnormality detecting unit 544. In the present embodiment, the abnormality detecting unit 544 can include a registration data comparing unit 720, an output simulator 730, an estimation data comparing unit 740, a reference data comparing unit 750, a mass abnormality detecting unit 762, a center of mass abnormality detecting unit 764, and an abnormality specifying unit 770.

[Comparison of the Registration Data]

The registration data comparing unit 720 can compare the information relating to a characteristic of a package registered in the product information storage unit 452 to the information relating to a characteristic of the workpiece to be determined based on the actual measured data relating to the workpiece. Examples of the actual measured data relating to the workpiece can include the data output by the force sensation sensor 242 and the like. This measured data may be data output by the force sensation sensor 242 during an interval in which the end effector 140 grips and lifts up the workpiece. The registration data comparing unit 720 can output information representing the comparison result to at least one of the mass abnormality detecting unit 762 and the center of mass abnormality detecting unit 764, for example.

[Comparison of Mass]

In one embodiment, the characteristic described above may be the mass. For example, the registration data comparing unit 720 can access the workpiece information storage unit 454 and acquire the identification information of the product or service corresponding to the workpiece. The registration data comparing unit 720 can access the product information storage unit 452 and acquire information representing the mass of a package that matches the identification information of the product or service described above (sometimes referred to as the package corresponding to the workpiece). Next, when the end effector 140 grips the workpiece and lifts up this workpiece, the registration data comparing unit 720 can acquire the force sensation information from the hand information acquiring unit 426 while the end effector 140 grips and lifts up the workpiece.

The registration data comparing unit 720 can determine the mass of the workpiece based on the magnitude of at least one of the force and the torque represented by the force sensation information. The registration data comparing unit 720 may determine the mass of the workpiece by using data in an interval during which the movement velocity of the workpiece is less than a predetermined value. The registration data comparing unit 720 may determine the mass of the workpiece by using data in an interval during which the movement of the workpiece is substantially stopped.

The registration data comparing unit 720 can compare the mass of the package registered in the product information storage unit 452 to the mass of the workpiece determined based on the force sensation information described above. The registration data comparing unit 720 may calculate the absolute value of the difference between the mass of the package registered in the product information storage unit 452 and the mass of the workpiece determined based on the force sensation information described above. The registration data comparing unit 720 may output information representing the absolute value of this difference as the information representing the comparison result.

[Comparison of the Position of the Center of Mass]

In another embodiment, the characteristic described above may be the position of the center of mass. For example, in a similar manner as in the embodiment described above, the registration data comparing unit 720 can acquire the information representing the position of the center of mass of the package corresponding to the workpiece. Furthermore, in a similar manner as in the embodiment described above, the registration data comparing unit 720 can determine the position of the center of mass of the workpiece based on the magnitude of at least one of the force and the torque represented by the force sensation information.

The registration data comparing unit 720 can compare the position of the center of mass of the package registered in the product information storage unit 452 to the position of the center of mass of the workpiece determined based on the force sensation information described above. The registration data comparing unit 720 may calculate the distance between the position of the center of mass of the package registered in the product information storage unit 452 and the position of the center of mass of the workpiece determined based on the force sensation information described above. The registration data comparing unit 720 may output information representing this distance as the information representing the comparison result.

[Simulation of the Output of the Force Sensation Sensor 242]

In the present embodiment, the output simulator 730 can simulate the output of at least one of the one or more sensors arranged on the robot 130. In one embodiment, the output simulator 730 can simulate the output of the force sensation sensor 242. In another embodiment, the output simulator 730 can simulate the output of the encoder 234. In yet another embodiment, the output simulator 730 can simulate a current value of the motor 232.

While the robot 130 is transporting the workpiece, the force sensation sensor 242 can detect the combined force of the gravitational force acting on the workpiece and the inertial force acting on the workpiece. Therefore, in order to accurately detect abnormalities relating to the transport of the workpiece using the output of the force sensation sensor 242, it is preferable to cancel out the effect of this inertial force using some kind of technique.

A technique that is considered for cancelling out the effect of this inertial force can include (i) differentiating the output of the encoder 234 twice to calculate the acceleration of the workpiece, (ii) calculating the inertial force acting on the workpiece based on this acceleration, (iii) and subtracting the magnitude of the inertial force from the magnitude of the force represented by the output of the force sensation sensor 242. However, due to the effect of a filter process and the like within the robot 130, even when the output of the encoder 234 is differentiated twice, it is extremely difficult to accurately calculate the acceleration of the workpiece.

Another technique that is considered for cancelling out the effect of this inertial force can include (i) estimating the output of the force sensation sensor 242 through a simulation and (ii) comparing the estimated value of the output of the force sensation sensor 242 to the actual output of the force sensation sensor 242. According to this technique, it is possible to easily improve the abnormality detection accuracy by adjusting the timing for synchronizing the estimated value of the output of the force sensation sensor 242 and the actual output of the force sensation sensor 242 and adjusting the threshold value used when detecting an abnormality based on the difference between the estimated value of the output of the force sensation sensor 242 and the actual output of the force sensation sensor 242.

[Simulation Based on the Plan Information]

In the present embodiment, the output simulator 730 can simulate the output of the force sensation sensor 242, based on the plan information. For example, the output simulator 730 can access the product information storage unit 452 and acquire the information representing the mass of the package corresponding to the workpiece. Furthermore, as an example, the output simulator 730 can access the workpiece information storage unit 454 and acquire the plan information relating to the workpiece. Next, the output simulator 730 can estimate the magnitude of at least one of the force and the torque to be detected by the force sensation sensor 242 when the robot 130 transports the work piece, based on the information representing the mass described above and the plan information. In this way, the magnitude of at least one of the force and the torque that would be detected by the force sensation sensor 242 when the robot 130 transports the workpiece can be estimated. The output simulator 730 may estimate the magnitude and the direction of at least one of the force and torque to be detected by the force sensation sensor 242. In this way, the magnitude and direction of at least one of the force and the torque that would be detected by the force sensation sensor 242 can be estimated.

As described above, the plan information can include information in which information representing a plurality of elapsed times from when the workpiece passes the reference position in the trajectory path and information representing the angle of each of the plurality of joints included in the robot arm 132 at each elapsed time are associated with each other. In this case, the output simulator 730 may estimate the magnitude of at least one of the force and the torque to be detected by the force sensation sensor 242 at each of the plurality of elapsed times, based on the plan information. In this way, the magnitude of at least one of the force and the torque that would be detected by the force sensation sensor 242 can be estimated. Furthermore, the output simulator 730 may output information in which each of the plurality of elapsed times and the estimated magnitude of at least one of the force and the torque are associated with each other (sometimes referred to as estimation information). The estimation information may be information in which each of the plurality of elapsed times and the estimated magnitude and direction of at least one of the force and the torque are associated with each other.

In the case described above, the output simulator 730 may (i) determine the angle of each of the plurality of joints at each of a plurality of positions in the trajectory path, based on the plan information, and (ii) estimate the magnitude of at least one of the force and the torque to be detected by the force sensation sensor 242, at each of the plurality of positions in the trajectory path. In this way, the magnitude of at least one of the force and the torque that would be detected by the force sensation sensor 242, at each of the plurality of positions in the trajectory path, can be estimated. Furthermore, the output simulator 730 may output the estimation information in which the angle of each of the plurality of joints and the estimated magnitude of at least one of the force and the torque are associated with each other. The estimation information may be information in which the angle of each of the plurality of joints and the estimated magnitude and direction of at least one of the force and the torque are associated with each other.

[Simulation of the Lifting Step]

In the present embodiment, the output simulator 730 can simulate the output of the force sensation sensor 242 in the lifting step. For example, the output simulator 730 can access the product information storage unit 452 and acquire the information representing the mass of the package corresponding to the workpiece and the information representing the position of the center of mass of this package. Furthermore, as an example, the output simulator 730 can access the workpiece information storage unit 454 and acquire the information relating to the grip position of the workpiece. Next, the output simulator 730 can estimate the magnitude of at least one of the force and the torque to be detected by the force sensation sensor 242 when the end effector 140 grips the workpiece at the grip position and lifts up this workpiece, based on the mass described above, the position of the center of mass described above, and the grip position described above. In this way, the magnitude of at least one of the force and the torque that would be detected by the force sensation sensor 242 in the case described above can be estimated. The output simulator 730 may estimate the magnitude and direction of at least one of the force and the torque to be detected by the force sensation sensor 242. In this way, the magnitude and direction of at least one of the force and the torque that would be detected by the force sensation sensor 242 can be estimated. The output simulator 730 may output the estimation information in the same manner as in the embodiment described above.

In the present embodiment, the estimation data comparing unit 740 can compare the estimated value of the force sensation sensor 242 output by the output simulator 730 to the value actually output by the force sensation sensor 242. The estimation data comparing unit 740 can output the information representing the comparison result to at least one of the mass abnormality detecting unit 762 and the center of mass abnormality detecting unit 764, for example.

(Comparison of Mass)

As an example, the estimation data comparing unit 740 can acquire the force sensation information from the hand information acquiring unit 426. The estimation data comparing unit 740 can acquire the estimation information from the output simulator 730. The estimation data comparing unit 740 can compare the magnitude of at least one of the force and the torque represented by the force sensation information to the magnitude of the at least one of the force and the torque represented by the estimation information. The estimation data comparing unit 740 may calculate the absolute value of the difference between the magnitude of at least one of the force and the torque represented by the force sensation information and the magnitude of the at least one of the force and the torque represented by the estimation information. The estimation data comparing unit 740 may output the information representing the absolute value of this difference as the information representing the comparison result.

[Comparison of the Position of the Center of Mass]

The estimation data comparing unit 740 may specify the position of the center of mass of the workpiece, based on the force sensation information. Furthermore, the estimation data comparing unit 740 may estimate the position of the center of mass of the workpiece based on the estimation information. The estimation data comparing unit 740 can compare the position of the center of mass of the workpiece specified based on the force sensation information to the position of the center of mass of the workpiece estimated based on the estimation information. The estimation data comparing unit 740 may calculate the distance between the position of the center of mass of the workpiece specified based on the force sensation information and the position of the center of mass of the workpiece estimated based on the estimation information. The estimation data comparing unit 740 may output the information representing this distance as the information representing the comparison result.

[Data Synchronization]

In one embodiment, the estimation data comparing unit 740 may associate the information representing at least one of the force and the torque included in the force sensation information and the information representing the magnitude of the at least one of the force and the torque included in the estimation information with each other, based on the information representing a plurality of timings included in the force sensation information and the information representing each of the plurality of elapsed times included in the estimation information. In this way, these pieces of information can be synchronized.

In another embodiment, the estimation data comparing unit 740 may associate the information representing the angle of each of the plurality of joints and the information representing the magnitude of at least one of the force and the torque at the distal end, based on the information representing the plurality of timings included in each of the angle information and the force sensation information. Furthermore, the estimation data comparing unit 740 may associate the information representing the magnitude of at least one of the force and the torque included in the force sensation information and the information representing the magnitude of the at least one of the force and the torque included in the estimation information with each other, based on the information representing the angle of each of the plurality of joints. In this way, these pieces of information can be associated with each other.

[Comparison to the Reference Data]

In the present embodiment, the reference data comparing unit 750 can compare the output of the force sensation sensor 242 at a reference timing to the current output of the force sensation sensor 242, with this reference timing being a specified timing or a specified timing in a specified step. Examples of this reference timing can include the start of the lifting step, the start of the placement step, and the like. The reference data comparing unit 750 can compare the magnitude of at least one of the force and the torque represented by the force sensation information at the reference timing to the magnitude of the at least one of the force and the torque represented by the current force sensation information. The reference data comparing unit 750 may calculate the absolute value of a difference between the magnitude of at least one of the force and the torque represented by the force sensation information at the reference timing and the magnitude of the at least one of the force and the torque represented by the current force sensation information. The reference data comparing unit 750 may output information representing the absolute value of this difference as the information representing the comparison result.

[Detection of Abnormalities Relating to the Mass]

In the present embodiment, the mass abnormality detecting unit 762 can detect an abnormality relating to the mass of the workpiece. The mass abnormality detecting unit 762 may detect this abnormality based on a plurality of algorithms. The mass abnormality detecting unit 762 may detect this abnormality based on an algorithm determined by the algorithm determining unit 542.

In one embodiment, the mass abnormality detecting unit 762 can detect the abnormality based on the comparison result of the registration data comparing unit 720. For example, the mass abnormality detecting unit 762 can detect that there is an abnormality if the absolute value of the difference between the two values compared by the registration data comparing unit 720 is greater than a predetermined threshold value (this threshold value may be an example of a fourth threshold value). Examples of the causes of this abnormality can include at least one of failure to identify the workpiece, failure to grip the workpiece, and damage of the workpiece.

In another embodiment, the mass abnormality detecting unit 762 can detect the abnormality based on the comparison result of the estimation data comparing unit 740. For example, the mass abnormality detecting unit 762 can detect that there is an abnormality if the absolute value of the difference between the two values compared by the estimation data comparing unit 740 is greater than a predetermined threshold value (this threshold value may be an example of a first threshold value). This first threshold value can be determined to be greater as the length of the delay time until the transfer control apparatus 150 acquires the force sensation information becomes longer, for example. This first threshold value may be determined such that the first threshold value in a case where the fluctuation width of the delay described above is greater than a predetermined value is greater than the first threshold value in a case where the fluctuation width of the delay described above is less than the predetermined value.

The mass abnormality detecting unit 762 may detect that there is an abnormality if the length of a continuous time period of a state in which the absolute value of the difference between the two values compared by the estimation data comparing unit 740 is greater than a predetermined threshold value (this threshold value may be an example of a first threshold value) is longer than a predetermined threshold value (this threshold value may be an example of a second threshold value). Intervals do not need to be provided in this continuous time period, but intervals of time periods shorter than a predetermined length may be provided in this continuous time period.

In this way, the mass abnormality detecting unit 762 can detect an abnormality relating to the transport of the workpiece, based on the magnitude of at least one of the force and the torque represented by the force sensation information and the magnitude of the at least one of the force and the torque estimated by the output simulator 730. The mass abnormality detecting unit 762 may detect the abnormality relating to the transport of the workpiece based on the magnitude and the direction of at least one of the force and the torque represented by the force sensation information and the magnitude and the direction of the at least one of the force and the torque estimated by the output simulator 730.

As described above, the force sensation information and the estimation information can be synchronized using a suitable technique. In this way, the mass abnormality detecting unit 762 can detect an abnormality relating to the transport of the workpiece based on the magnitude of at least one of the force and the torque represented by force sensation information and the magnitude of the at least one of the force and the torque estimated by the output simulator 730, which are associated with each other.

In yet another embodiment, the mass abnormality detecting unit 762 can detect an abnormality based on the comparison result of the reference data comparing unit 750. For example, the mass abnormality detecting unit 762 can detect that there is an abnormality if the absolute value of the difference between the two values compared by the reference data comparing unit 750 is greater than a predetermined threshold value.

[Detection of Abnormalities Relating to the Position of the Center of Mass]

In the present embodiment, the center of mass abnormality detecting unit 764 can detect an abnormality relating to the position of the center of mass of the workpiece. The center of mass abnormality detecting unit 764 may detect this abnormality based on a plurality of algorithms. The center of mass abnormality detecting unit 764 may detect this abnormality based on the algorithm determined by the algorithm determining unit 542.

In one embodiment, the center of mass abnormality detecting unit 764 can detect the abnormality based on the comparison result of the registration data comparing unit 720. For example, the center of mass abnormality detecting unit 764 can detect that there is an abnormality if the distance between the positions of the two centers of mass compared by the registration data comparing unit 720 is greater than a predetermined value. Examples of the causes of this abnormality can include at least one of failure to identify the workpiece, failure to grip the workpiece, and damage of the workpiece.

In another embodiment, the center of mass abnormality detecting unit 764 can detect an abnormality based on the comparison result of the estimation data comparing unit 740. For example, the center of mass abnormality detecting unit 764 can detect that there is an abnormality if the distance between the positions of the two centers of mass compared by the estimation data comparing unit 740 is greater than a predetermined value.

In yet another embodiment, the center of mass abnormality detecting unit 764 can detect an abnormality based on a comparison result of the reference data comparing unit 750. For example, the center of mass abnormality detecting unit 764 can detect that there is an abnormality if the distance between the positions of the two centers of mass compared by the reference data comparing unit 750 is greater than a predetermined threshold value.

In yet another embodiment, the center of mass abnormality detecting unit 764 can detect an abnormality based on the analysis results of the image analyzing unit 520 and the output of the output simulator 730. For example, the center of mass abnormality detecting unit 764 can acquire the information representing the geometric center specified by the transport target specifying unit 522 of the image analyzing unit 520. Furthermore, the center of mass abnormality detecting unit 764 can specify the position of the center of mass of the workpiece based on the estimation information output by the output simulator 730. The center of mass abnormality detecting unit 764 can detect that there is an abnormality if the distance between the position of the geometric center described above and the position at which the center of the workpiece described above is projected onto the top surface of the target item is greater than a predetermined threshold value (this threshold value may be an example of a third threshold value). Examples of the causes of this abnormality can include at least one of failure to identify the workpiece, failure to grip the workpiece, and damage of the workpiece.

[Specification of the Content of the Abnormality]

In the present embodiment, the abnormality specifying unit 770 can specify the content of the detected abnormality. The abnormality specifying unit 770 can acquire information representing that an abnormality relating to the mass has been detected, from the mass abnormality detecting unit 762. In this way, the abnormality specifying unit 770 can judge whether there is an abnormality relating to the mass. Similarly, the abnormality specifying unit 770 can acquire information representing that an abnormality relating to the position of the center of mass has been detected, from the center of mass abnormality detecting unit 764. The abnormality specifying unit 770 can judge whether there is an abnormality relating to the position of the center of mass.

Furthermore, the abnormality specifying unit 770 may acquire information representing the state of the robot arm 132 from the arm information acquiring unit 424. The abnormality specifying unit 770 may acquire the information representing the state of the end effector 140 from the hand information acquiring unit 426.

The abnormality specifying unit 770 may specify the content of the detected abnormality based on these pieces of information. In this way, the abnormality specifying unit 770 can detect at least one of failure to identify the workpiece, failure to grip the workpiece, and damage of the workpiece, based on the magnitude of at least one of the force and the torque represented by the force sensation information and the magnitude of the at least one of the force and the torque estimated by the output simulator 730.

In one embodiment, the abnormality specifying unit 770 may detect that there is at least one of failure to identify the workpiece, failure to grip the workpiece, and damage of the workpiece if at least one of the mass abnormality detecting unit 762 and the center of mass abnormality detecting unit 764 has detected an abnormality based on the comparison result of the registration data comparing unit 720. Similarly, the abnormality specifying unit 770 may detect that there is at least one of failure to identify the workpiece, failure to grip the workpiece, and damage of the workpiece if at least one of the mass abnormality detecting unit 762 and the center of mass abnormality detecting unit 764 has detected an abnormality based on the comparison result of the estimation data comparing unit 740. The abnormality specifying unit 770 may detect that there is at least one of failure to identify the workpiece, failure to grip the workpiece, and damage of the workpiece if at least one of the mass abnormality detecting unit 762 and the center of mass abnormality detecting unit 764 has detected an abnormality based on the comparison result of the reference data comparing unit 750.

In another embodiment, the abnormality specifying unit 770 can acquire the depressurization information from the arm information acquiring unit 424. Furthermore, the abnormality specifying unit 770 can detect that there is an abnormality in the pressure of the depressurization chamber 312 if the pressure represented by the depressurization information is less than a predetermined value. The abnormality specifying unit 770 can detect that the workpiece is damaged if (i) an abnormality in the pressure of the depressurization chamber 312 is not detected and the mass abnormality detecting unit 762 does not detect an abnormality and (ii) the center of mass abnormality detecting unit 764 detects that there is an abnormality.

In another embodiment, the abnormality specifying unit 770 can acquire the depressurization information from the arm information acquiring unit 424. Furthermore, the abnormality specifying unit 770 may detect that there is an abnormality in the pressure of the depressurization chamber 312 if the pressure represented by the depressurization information is less than a predetermined value. The abnormality specifying unit 770 may detect that the workpiece is damaged if (i) an abnormality in the pressure of the depressurization chamber 312 is not detected and (ii) the mass abnormality detecting unit 762 detects that there is an abnormality.

As an example, in recent years, there are cases where a portion of a package in which a plurality of products are packaged is divided and the products are displayed in a store while contained in the package, in order to simplify the display of the products. In consideration of such a usage state, packages formed to have portions that can be separated easily are sold commercially.

When the robot 130 transfers such a package, it is conceivable for this package to be separated into top and bottom portions during the transport of the package or for a portion of the package to be broken to significantly deform the package. In such a case, this package can be transported while the top portion of the divided or broken package is gripped by the end effector 140. Therefore, even when a portion of the package is separated or broken, the pressure fluctuation of the depressurization chamber 312 is relatively small, and it is difficult to detect damage of the workpiece based on the pressure fluctuation of the depressurization chamber 312. However, according to the present embodiment, it is possible to detect damage of the workpiece even in such a case.

In yet another embodiment, the abnormality specifying unit 770 can acquire the force sensation information from the hand information acquiring unit 426. The abnormality specifying unit 770 may judge whether the end effector 140 is excessively pressing the workpiece, based on the magnitude of the force represented by the force sensation information. For example, the abnormality specifying unit 770 may judge that the end effector 140 is excessively pressing the workpiece if, during a time period in which at least one of the gripping step, the placement step, and the release step is performed, the magnitude of the force represented by the force sensation information is greater than a predetermined value.

In yet another embodiment, the abnormality specifying unit 770 may judge that the robot 130 is simultaneously lifting up a plurality of packages 102, if the position of the geometric center of the top surface of the workpiece specified by the transport target specifying unit 522 and the position of the center of mass of the workpiece determined based on the force sensation information satisfy a predetermined condition. This predetermined condition may be a condition that the distance between the position of the geometric center described above and the position at which the center of mass of the workpiece described above is projected onto the top surface of the target item is greater than a predetermined threshold value (this threshold value may be an example of a third threshold value).

The abnormality detecting unit 544 may be an example of a first detecting unit, a second detecting unit, and a third detecting unit. The registration data comparing unit 720 may be an example of a mass information acquiring unit and a center of mass identifying unit. The output simulator 730 may be an example of a mass information acquiring unit, a plan information acquiring unit, and a force sensation estimating unit. The mass abnormality detecting unit 762 may be an example of a first detecting unit. The center of mass abnormality detecting unit 764 may be an example of a second detecting unit and a third detecting unit. The magnitude of at least one of the force and the torque detected by the force sensation sensor 242 may be an example of the magnitude of the at least one of the force and the torque detected at the distal end of the manipulator. The abnormality relating to the mass detected by the mass abnormality detecting unit 762 may be an example of an abnormality relating to the mass of a target item represented by the force sensation information. The abnormality relating to the center of mass detected by the center of mass abnormality detecting unit 764 may be an example of an abnormality relating to the center of mass of a target item represented by the force sensation information. The abnormality in the pressure of the depressurization chamber 312 may be an example of an abnormality relating to the pressure represented by the depressurization information.

In the present embodiment, the details of the abnormality detecting unit 544 are described using an example of a case in which the mass abnormality detecting unit 762 detects an abnormality relating to the mass and the center of mass abnormality detecting unit 764 detects an abnormality relating to the position of the center of mass. However, the abnormality detecting unit 544 is not limited to the present embodiment. In another embodiment, the registration data comparing unit 720 may detect these abnormalities. In yet another embodiment, the estimation data comparing unit 740 may detect these abnormalities. In yet another embodiment, the reference data comparing unit 750 may detect these abnormalities.

Figure 8:
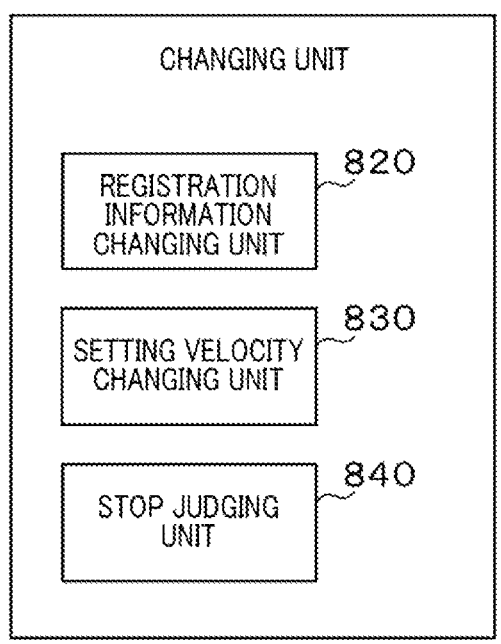
FIG. 8 schematically shows an example of an internal configuration of the changing unit 546.

FIG. 8 schematically shows an example of an internal configuration of the changing unit 546. In the present embodiment, the changing unit 546 can include a registration information changing unit 820, a setting velocity changing unit 830, and a stop judging unit 840.

In the present embodiment, if the mass abnormality detecting unit 762 has detected an abnormality based on the comparison result of the registration data comparing unit 720, the registration information changing unit 820 can determine whether to update the information relating to the mass of the package corresponding to the workpiece stored in the product information storage unit 452. For example, if the mass of the workpiece specified based on the force sensation information is greater than the mass of the package corresponding to the workpiece stored in the product information storage unit 452, the registration information changing unit 820 can make a determination to update the information in the product information storage unit 452.

If the center of mass abnormality detecting unit 764 has detected an abnormality based on the comparison result of the registration data comparing unit 720, the registration information changing unit 820 may determine whether to update the position of the center of mass of the package corresponding to the workpiece stored in the product information storage unit 452. For example, if an abnormality relating to the position of the center of mass of the workpiece specified based on the force sensation information has been detected, the registration information changing unit 820 can make a determination to update the information in the product information storage unit 452.

If the center of mass abnormality detecting unit 764 has detected an abnormality based on the comparison result of the registration data comparing unit 720, when the position of the geometric center of the top surface of the workpiece specified by the transport target specifying unit 522 and the position of the center of mass of the workpiece determined based on the force sensation information satisfy a predetermined condition, the registration information changing unit 820 may determine whether to update the grip position of the package corresponding to the workpiece stored in the product information storage unit 452. This condition may be a condition that the distance between the position of the geometric center described above and the position at which the center of the mass of the workpiece described above is projected onto the top surface of the target item is greater than a predetermined threshold value (this threshold value may be an example of a third threshold value).

As an example, the registration information changing unit 820 can analyze the image of the workpiece and judge whether the robot 130 is simultaneously lifting up a plurality of packages 102. If it is judged that the robot 130 is simultaneously lifting up a plurality of packages 102, the registration information changing unit 820 can output information representing this judgment result, for example, to the stop judging unit 840. On the other hand, if it is judged that the robot 130 is not simultaneously lifting up a plurality of packages 102, the registration information changing unit 820 can make a determination to update the grip position of the package corresponding to the workpiece stored in the product information storage unit 452. The registration information changing unit 820 may register a more suitable position, which is a position different from the current grip position, in the product information storage unit 452 as a new grip position.

In the present embodiment, if at least one of the mass abnormality detecting unit 762 and the center of mass abnormality detecting unit 764 has detected an abnormality, the setting velocity changing unit 830 can determine whether to adjust the transport velocity of the workpiece represented by the plan information. Furthermore, if a determination is made to adjust the transport velocity of the workpiece, the setting velocity changing unit 830 can output information relating to a change of the transport velocity (sometimes referred to as change information) to the control signal output unit 552.

In one embodiment, the setting velocity changing unit 830 can simulate the output of the force sensation sensor 242 in a case where it is assumed that the plan represented by the plan information is to be continued, using the output simulator 730, for example. The setting velocity changing unit 830 can judge whether dropping or damage of the workpiece would occur if the plan represented by the plan information is continued, based on at least one of a result of the simulation performed by the output simulator 730, an upper limit value of the transportable mass of the end effector 140, and an upper limit value of the durability of the workpiece.

If it is judged that dropping or damage of the workpiece would occur, the setting velocity changing unit 830 may output information representing this judgment result to the stop judging unit 840. On the other hand, if it is judged that dropping or damage of the workpiece would not occur, the setting velocity changing unit 830 can make a determination to adjust the transport velocity of the workpiece. The setting velocity changing unit 830 may adjust the transport velocity of the workpiece such that the transport velocity of the workpiece after the adjustment is less than the transport velocity represented by the plan information.

In another embodiment, if the abnormality specifying unit 770 has detected a specified type of abnormality, the setting velocity changing unit 830 may make a determination to adjust the transport velocity of the workpiece represented by the plan information. In yet another embodiment, if the abnormality specifying unit 770 has not detected a specified type of abnormality, the setting velocity changing unit 830 may make a determination to adjust the transport velocity of the workpiece represented by the plan information.

In the present embodiment, the stop judging unit 840 can judge whether to stop the transport of the workpiece. Furthermore, if a determination is made to stop the transport of the workpiece, the stop judging unit 840 can output information representing the stoppage of the transport of the workpiece to the warning information output unit 554.

In one embodiment, if the stop judging unit 840 has acquired information from the registration information changing unit 820 representing that the robot 130 is simultaneously lifting up a plurality of packages 102, the stop judging unit 840 can make a determination to stop the transport of the workpiece. In another embodiment, if the stop judging unit 840 has acquired information from the setting velocity changing unit 830 representing that dropping or damage of the workpiece would occur when the plan represented by the plan information is continued, the stop judging unit 840 can make a determination to stop the transport of the workpiece.

Figure 9:
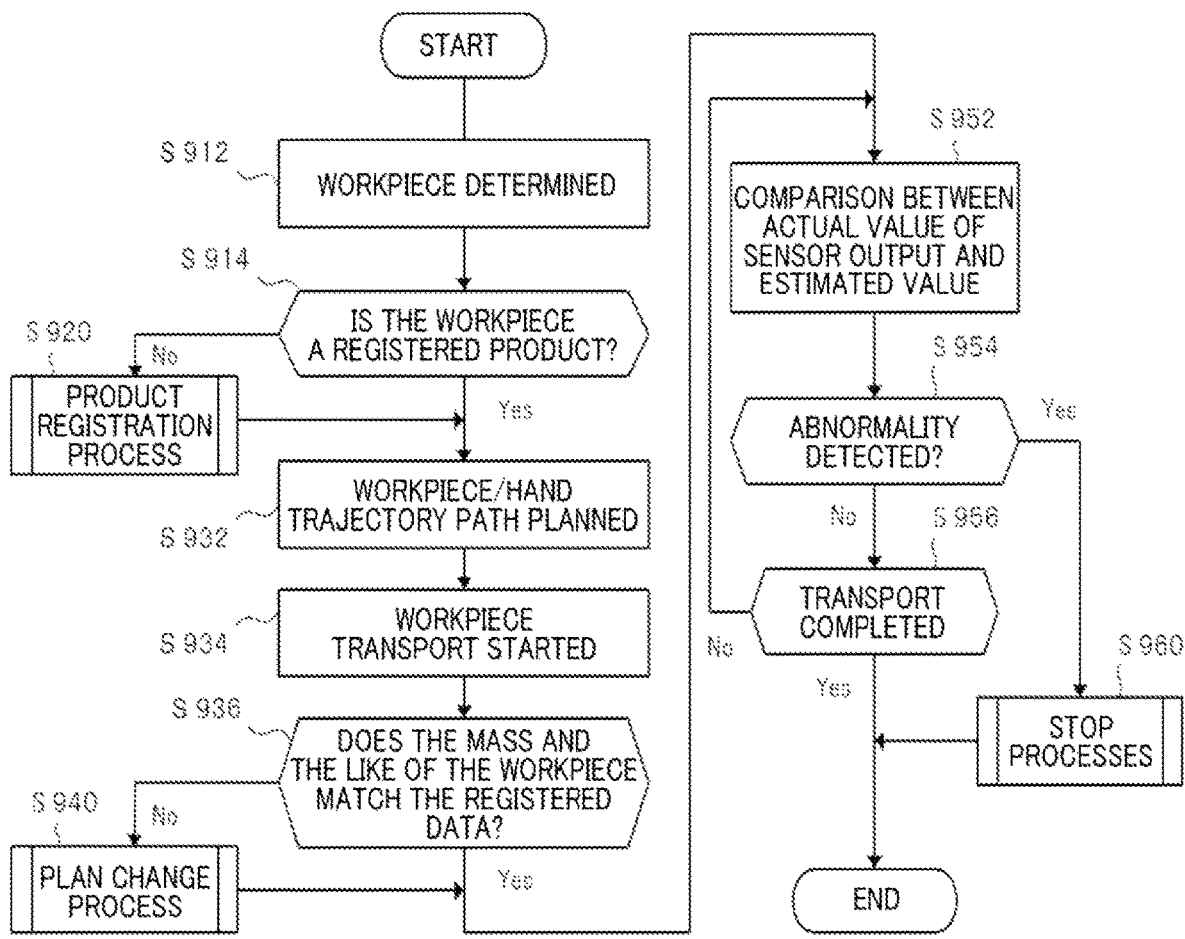
FIG. 9 schematically shows an example of the transfer process performed by the transfer system 100.

FIG. 9 schematically shows an example of the transfer process performed by the transfer system 100. FIG. 9 may be an example of information processing in the transfer control unit 436. According to the present embodiment, first, at S912, the transport target specifying unit 522 can determine the package 102 that is to be the target of the transport process (sometimes referred to as the workpiece), from among one or more packages 102 mounted on the depalletizing platform 110, based on the image captured by the image capturing apparatus 160.

Next, at S914, the transport target specifying unit 522 can access the product information storage unit 452 and check whether there is a package that matches the feature of the outer appearance of the workpiece among the one or more packages registered in the product information storage unit 452. For example, the product information storage unit 452 can store information indicating the feature of the outer appearance of the package to be used for a product or service, in association with identification information of this product or service. The transport target specifying unit 522 can make a request to the product information storage unit 452 for a search for a package that matches the feature of the outer appearance of the workpiece. The product information storage unit 452 can compare the features of the outer appearances of one or more packages stored in the product information storage unit 452 to the feature of the outer appearance of the workpiece, and extracts the identification information of a product or service of a package whose feature is identical or similar. The product information storage unit 452 can output the extracted identification information of the product or service as a response to the request described above. In this way, the transport target specifying unit 522 can judge whether the type of the current workpiece is the same as the type of a package that is already registered.

If the workpiece is not registered in the product information storage unit 452 (S914: No), at S920, a product registration process can be performed. Specifically, the product information registering unit 440 can register information representing the characteristic of the current workpiece in the product information storage unit 452. When the product registration process of the current workpiece is completed, the process of S932 can be performed.

On the other hand, if the workpiece is registered in the product information storage unit 452 (S914: Yes), at S932, the trajectory path planning unit 530 can plan the trajectory path of the end effector 140 during the period from when the workpiece arranged on the depalletizing platform 110 is gripped by the end effector 140 to when this workpiece is placed at a prescribed position on the reception platform 120, for example. In the present embodiment, the trajectory path planning unit 530 can plan the trajectory path such that, after the end effector 140 has gripped the workpiece, the robot 130 lifts up the workpiece to a prescribed height and temporarily stops the workpiece at this position. It should be noted that the trajectory path planning unit 530 may plan the trajectory path of the distal end of the robot arm 132.

Furthermore, at S932, the algorithm determining unit 542 can divide the trajectory path planned by the trajectory path planning unit 530 into a plurality of segments, and determine an algorithm to be used by the abnormality detecting unit 544 to detect an abnormality for each segment. For example, in a case where the trajectory path 600 described in relation to FIG. 6 has been planned by the trajectory path planning unit 530, the algorithm determining unit 542 can make a determination to detect an abnormality based on the comparison result of the registration data comparing unit 720 in segment B. The algorithm determining unit 542 can make a determination to detect an abnormality based on the comparison result of the reference data comparing unit 750 in segment Cm. The algorithm determining unit 542 can make a determination to detect an abnormality based on the comparison result of the estimation data comparing unit 740 in segment Ch. The algorithm determining unit 542 can make a determination to detect an abnormality based on the comparison result of the reference data comparing unit 750 in segment D.

Next, at S934, the control signal output unit 552 can generate a control signal for controlling the operation of the robot 130. The control signal output unit 552 can determine the change over time of the angle of each of the plurality of joints included in the robot arm 132, such that the end effector 140 moves along the trajectory path planned by the trajectory path planning unit 530. The control signal output unit 552 can generate a control signal for controlling the operation of the plurality of motors 232 for adjusting the angle of each of the plurality of joints included in the robot arm 132. The control signal output unit 552 can transmit the generated control signal to the drive control unit 134. In this way, the workpiece transport process can be started.

Next, at S936, the registration data comparing unit 720 can compare (i) the information relating to the characteristic of the package corresponding to the workpiece, which is registered in the product information storage unit 452, to (ii) the information relating to the characteristic of the workpiece determined based on the actual measured data relating to the workpiece. If these pieces of information match, the abnormality detecting unit 544 does not need to detect an abnormality. On the other hand, if these pieces of information do not match, the abnormality detecting unit 544 can detect that there is an abnormality. As described above, in the present embodiment, the workpiece can be temporarily stopped at the prescribed position. The registration data comparing unit 720 preferably compares these pieces of information while the workpiece is stopped.

If the abnormality detecting unit 544 has detected an abnormality (S936: No), the plan change process can be performed at S940. Specifically, the changing unit 546 can make a determination to change the plan of the trajectory path planning unit 530, update the product information storage unit 452, and the like. If the changing unit 546 has made a determination to change the plan of the trajectory path planning unit 530, the changing unit 546 can transmit information representing the content of this change to the control signal output unit 552. The control signal output unit 552 can generate a control signal causing compliance with the content of this change. The control signal output unit 552 can transmit the generated signal to the drive control unit 134. When the plan change process is completed, the process of S952 can be performed.

On the other hand, if the abnormality detecting unit 544 has not detected an abnormality (S936: Yes), the workpiece transport process can be continued. After this, at S952, the abnormality detecting unit 544 can detect the abnormality based on the comparison result of the estimation data comparing unit 740 while the workpiece moves along segment Ch of the trajectory path 600.

If the abnormality detecting unit 544 has detected an abnormality (S954: Yes), the stop process can be performed at S960, for example. Specifically, the stop judging unit 840 can make a determination to stop the transport of the workpiece, and output information representing that the transport of the workpiece is to be stopped to the warning information output unit 554. The warning information output unit 554 can notify the operator about the information representing that the transport of the workpiece is to be stopped, in accordance with the occurrence of an abnormality. After this, the workpiece transport process can be finished.

On the other hand, if the abnormality detecting unit 544 has not detected an abnormality (S954: No), at S956, the abnormality detecting unit 544 can judge whether the transport of the workpiece has been completed. If it is judged that the transport of the workpiece has not been completed (S956: No), the process of S952 can be repeated. On the other hand, if it is judged that the transport of the workpiece has been completed (S956: Yes), the workpiece transport process can be finished.

Figure 10:
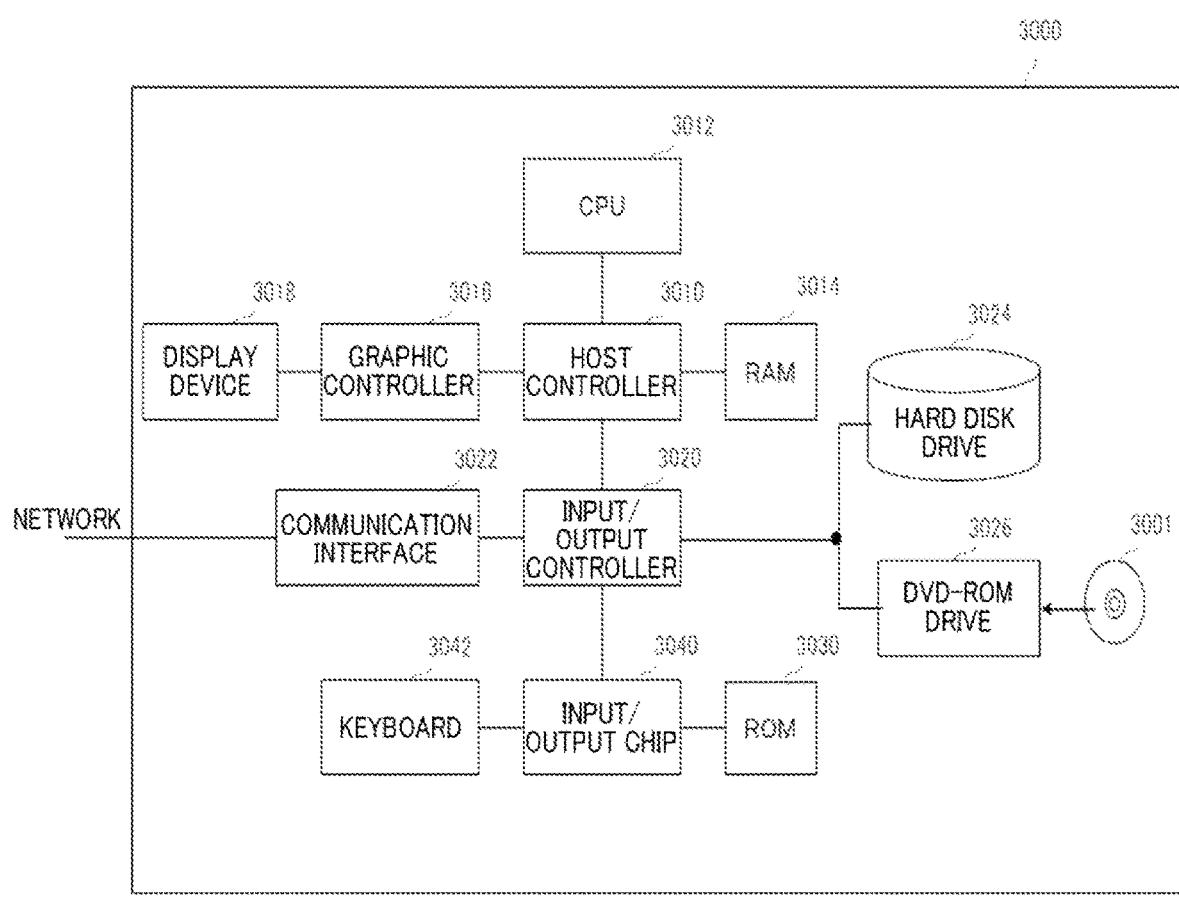
FIG. 10 schematically shows an example of an internal configuration of a computer 3000.

FIG. 10 shows an example of a computer 3000 in which aspects of the present invention may be wholly or partly embodied. A portion of the transfer system 100 may be realized by the computer 3000. For example, at least one of the drive control unit 134 and the transfer control apparatus 150 can be realized by the computer 3000.

A program that is installed in the computer 3000 can cause the computer 3000 to perform operations associated with apparatuses of the embodiments of the present invention or to function as one or more "units" thereof, and/or cause the computer 3000 to perform processes of the embodiments of the present invention or steps thereof. Such a program may be executed by the CPU 3012 to cause the computer 3000 to perform certain operations associated with some or all of the blocks of flowcharts and block diagrams described herein.

The computer 3000 according to the present embodiment can include a CPU 3012, a RAM 3014, a graphic controller 3016, and a display device 3018, which are mutually connected by a host controller 3010. The computer 3000 can also include input/output units such as a communication interface 3022, a hard disk drive 3024, a DVD-ROM drive 3026 and an IC card drive, which are connected to the host controller 3010 via an input/output controller 3020. The computer can also include legacy input/output units such as a ROM 3030 and a keyboard 3042, which are connected to the input/output controller 3020 through an input/output chip 3040.

The CPU 3012 can operate according to programs stored in the ROM 3030 and the RAM 3014, thereby controlling each unit. The graphic controller 3016 can obtain image data generated by the CPU 3012 on a frame buffer or the like provided in the RAM 3014 or in itself, and cause the image data to be displayed on the display device 3018.

The communication interface 3022 can communicate with other electronic devices via a network. The hard disk drive 3024 can store programs and data used by the CPU 3012 within the computer 3000. The DVD-ROM drive 3026 can read the programs or the data from the DVD-ROM 3001, and provide the hard disk drive 3024 with the programs or the data via the RAM 3014. The IC card drive can read programs and data from an IC card, and/or write programs and data into the IC card.

The ROM 3030 can store therein a boot program or the like executed by the computer 3000 at the time of activation, and/or a program depending on the hardware of the computer 3000. The input/output chip 3040 may also connect various input/output units via a parallel port, a serial port, a keyboard port, a mouse port, and the like to the input/output controller 3020.

A program can be provided by computer readable media such as the DVD-ROM 3001 or the IC card. The program can be read from the computer readable media, installed into the hard disk drive 3024, RAM 3014, or ROM 3030, which are also examples of computer readable media, and executed by the CPU 3012. The information processing described in these programs can be read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under control of the CPU 3012, can read transmission data stored on a transmission buffering region provided in a recording medium such as the RAM 3014, the hard disk drive 3024, the DVD-ROM 3001, or the IC card, and transmit the read transmission data to a network or writes reception data received from a network to a reception buffering region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and perform various types of processing on the data on the RAM 3014. The CPU 3012 may then write back the processed data to the external recording medium.

Various types of information, such as various types of programs, data, tables, and databases, may be stored in the recording medium to undergo information processing. The CPU 3012 may perform various types of processing on the data read from the RAM 3014, which includes various types of operations, processing of information, condition judging, conditional branch, unconditional branch, search/replace of information, and the like, as described throughout this disclosure and designated by an instruction sequence of programs, and writes the result back to the RAM 3014. In addition, the CPU 3012 may search for information in a file, a database, and the like, in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 3000. In addition, a recording medium such as a hard disk or a RAM provided in a server system connected to a dedicated communication network or the Internet can be used as the computer readable media, thereby providing the program to the computer 3000 via the network.

While the embodiments of the present invention have been described, the technical scope of the invention is not limited to the above described embodiments. It is apparent to persons skilled in the art that various alterations and improvements can be added to the above-described embodiments. Features described in relation to a certain embodiment can be applied to the other embodiments, as long as this does not result in a technical contradiction. Each configurational element may have the same features as other configurational elements having the same name but different reference numerals. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, and the like, such as field-programmable gate arrays (FPGA), programmable logic arrays (PLA), and the like.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, and the like. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, and the like, and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, and the like, to execute the computer-readable instructions to create means for performing operations specified in the flowcharts or block diagrams. Examples of processors include computer processors, processing units, microprocessors, digital signal processors, controllers, microcontrollers, and the like.

LIST OF REFERENCE NUMERALS

100: transfer system, 102: package, 110: depalletizing platform, 120: reception platform, 130: robot, 132: robot arm, 134: drive control unit, 140: end effector, 150: transfer control apparatus, 160: image capturing apparatus, 180: sensor, 190: sensor, 232: motor, 234: encoder, 242: force sensation sensor, 246: gripping member, 310: main body, 312: depressurization chamber, 314: connection member, 320: adhesion pad, 330: valve, 340: intake pipe, 422: image data acquiring unit, 424: arm information acquiring unit, 426: hand information acquiring unit, 432: input/output control unit, 434: image capturing control unit, 436: transfer control unit, 440: product information registering unit, 450: storage unit, 452: product information storage unit, 454: workpiece information storage unit, 456: model information storage unit, 458: setting information storage unit, 520: image analyzing unit, 522: transport target specifying unit, 524: grip state determining unit, 530: trajectory path planning unit, 542: algorithm determining unit, 544: abnormality detecting unit, 546: changing unit, 552: control signal output unit, 554: warning information output unit, 600: trajectory path, standby position, 620: grip position, 622: transport preparation position, 624: placement preparation position, 630: release position, 720: registration data comparing unit, 730: output simulator, 740: estimation data comparing unit, 750: reference data comparing unit, 762: mass abnormality detecting unit, 764: center of mass abnormality detecting unit, 770: abnormality specifying unit, 820: registration information changing unit, 830: setting velocity changing unit, 840: stop judging unit, 3000: computer, 3001: DVD-ROM, 3010: host controller, 3012: CPU, 3014: RAM, 3016: graphic controller, 3018: display device, 3020: input/output controller, 3022: communication interface, 3024: hard disk drive, 3026: DVD-ROM drive, 3030: ROM, 3040: input/output chip, 3042: keyboard

What is claimed is:

1. A control apparatus comprising:
   a force sensation information acquiring unit configured to acquire force sensation information for representing a magnitude of at least one of a force and a torque at a distal end of a manipulator while a target item that is a target to be transported by the manipulator is being transported;
   a mass information acquiring unit configured to acquire mass information for representing a predetermined value as a mass of the target item;
   a plan information acquiring unit configured to acquire plan information for representing content of a plan relating to a trajectory path of at least one of the distal end of the manipulator and a gripping unit for gripping the target item arranged at the distal end;
   a force sensation estimating unit configured to determine an estimated magnitude of at least one of a force and a torque to be detected at the distal end of the manipulator when the manipulator transports the target item, based on the mass information and the plan information; and
   a first detecting unit configured to detect an abnormality relating to transporting of the target item, based on the magnitude of at least one of the force and the torque represented by the force sensation information and based on the estimated magnitude of at least one of the force and the torque determined by the force sensation estimating unit, by detecting a case where an absolute value of a difference between the magnitude of at least one of the force and the torque represented by the force sensation information and the estimated magnitude of at least one of the force and the torque determined by the force sensation estimating unit is greater than a first threshold value, wherein the first threshold value is determined to become greater when a length of a delay time concerning acquisition of the force sensation information by the force sensation information acquiring unit is longer than a predetermined value.

2. The control apparatus according to claim 1, wherein the force sensation estimating unit is configured to estimate a direction of at least one of the force and the torque at the distal end of the manipulator, and
   the first detecting unit is configured to detect the abnormality relating to the transporting of the target item by detecting the direction of at least one of the force and the torque represented by the force sensation information and a direction of at least one of the force and the torque estimated by the force sensation estimating unit, wherein the force sensation information represents the magnitude and the direction of at least one of the force and the torque at the distal end of the manipulator.

3. The control apparatus according to claim 1, wherein the first detecting unit is configured to detect the abnormality in a time period during which the absolute value of the difference between the magnitude of at least one of the force and the torque represented by the force sensation information and the estimated magnitude of at least one of the force and the torque determined by the force sensation estimating unit is greater than the first threshold value, and where the abnormality continues for a time period greater than a second threshold value.

4. The control apparatus according to claim 1, wherein the force sensation estimating unit is configured to estimate the magnitude of at least one of the force and the torque to be detected at the distal end of the manipulator at each of a plurality of elapsed times, based on the plan information,
   the force sensation estimating unit is configured to output estimation information in which each of the plurality of elapsed times is associated with the estimated magnitude of at least one of the force and torque,
   the first detecting unit is configured to associate the information representing the magnitude of at least one of the force and the torque included in the force sensation information with the information representing the estimated magnitude of at least one of the force and the torque included in the estimation information, based on information representing a plurality of timings included in the force sensation information and information representing the plurality of elapsed times included in estimation information, and
   the first detecting unit is configured to detect the abnormality relating to the transporting of the target item based on the information representing the magnitude of at least one of the force and the torque included in the force sensation information and the information representing the estimated magnitude of at least one of the force and the torque included in the estimation information that are associated with each other, wherein the force sensation information includes information representing the plurality of timings and information representing the magnitude of at least one of the force and the torque at the distal end at each timing, and the plan information includes information representing the plurality of elapsed times from when the target item passed a reference position in a trajectory path and information representing an angle of each of a plurality of joints included in the manipulator at each elapsed time.

5. The control apparatus according to claim 1, further comprising:
   an angle information acquiring unit configured to acquire angle information, wherein the angle information is for representing an angle of each of a plurality of joints included in the manipulator, wherein the angle information includes information representing a plurality of timings and information representing an angle of each of the plurality of joints at each timing, wherein the force sensation information includes information representing a plurality of timings and information representing a magnitude of at least one of the force and the torque at the distal end at each timing, and
   wherein:
   the force sensation estimating unit is configured to determine an angle of each of the plurality of joints at each of a plurality of positions on the trajectory path based on the plan information;
   the force sensation estimating unit is configured to estimate magnitude of at least one of a force and a torque to be detected at the distal end of the manipulator at each of the plurality of positions on the trajectory path;
   the force sensation estimating unit is configured to output estimation information in which the angle of each of the plurality of joints and the estimated magnitude of at least one of the force and the torque are associated with each other;
   the first detecting unit is configured to associate the information representing the angle of each of the plurality of joints with the information representing the magnitude of at least one of the force and the torque at the distal end, based on the information representing the plurality of timings included in each of the angle information and the force sensation information;

the first detecting unit is configured to associate the information representing the magnitude of at least one of the force and the torque included in the force sensation information with information representing the estimated magnitude of at least one of the force and the torque included in the estimation information, based on the information representing the angle of each of the plurality of joints; and the first detecting unit is configured to detect an abnormality relating to the transporting of the target item, based on the information representing the magnitude of at least one of the force and the torque included in the force sensation information and the information representing the estimated magnitude of at least one of the force and the torque included in the estimation information that are associated with each other.

6. The control apparatus according to claim 1, wherein the abnormality relating to the transporting of the target item represents at least one of an identification problem of the target item, a gripping problem of the target item, dropping of the target item, damage of the target item, and a collision involving the target item.

7. The control apparatus according to claim 1, further comprising:
a depressurization information acquiring unit configured to acquire depressurization information representing a magnitude of pressure inside a depressurization chamber arranged in the gripping unit, wherein
the first detecting unit is configured to detect damage of the target item in a case where (i) neither an abnormality relating to pressure represented by the depressurization information nor an abnormality relating to the mass of the target item represented by the force sensation information is detected and (ii) an abnormality relating to a center of mass of the target item represented by the force sensation information is detected.

8. The control apparatus according to claim 1, further comprising:
an image information acquiring unit configured to acquire image data of the target item at a timing before the target item is gripped by the manipulator;
a center of mass estimating unit configured to estimate a position of a center of mass of the target item, based on the image data; and
a grip position determining unit configured to determine a grip position at which the target item is to be gripped by the gripping unit, and
wherein:
the force sensation estimating unit is configured to determine the estimated magnitude of at least one of a force and a torque to be detected at the distal end, in a case where the gripping unit grips the target item at the grip position and the target item is lifted up, based on the mass of the target item represented by the mass information, the position of the center of mass of the target item estimated by the center of mass estimating unit, and the grip position determined by the grip position determining unit; and
the first detecting unit is configured to detect at least one of an identification problem of the target item, a gripping problem of the target item, and damage of the target item, based on the magnitude of at least one of the force and the torque represented by the force sensation information and the estimated magnitude of at least one of the force and the torque determined by the force sensation estimating unit.

9. The control apparatus according to claim 1, further comprising:
an image information acquiring unit configured to acquire image data of the target item at a timing before the target item is gripped by the manipulator;
a geometric center identifying unit configured to identify a position of a geometric center of a top surface of the target item, based on the image data;
a grip position determining unit configured to determine a grip position at which the target item is to be gripped by the gripping unit;
a center of mass identifying unit configured to identify a position of a center of mass of the target item based on (i) the magnitude of at least one of the force and the torque represented by the force sensation information in a case where the gripping unit grips the target item at the grip position and the target item is lifted up by the gripping unit and (ii) the grip position of the target item; and
a second detecting unit configured to detect at least one of an identification problem of the target item, a gripping problem of the target item, and damage of the target item, in a case where a distance between a position of the geometric center of the top surface of the target item and a position at which the center of mass of the target item is projected onto the top surface of the target item is greater than a third threshold value.

10. The control apparatus according to claim 1, further comprising:
an image information acquiring unit configured to acquire image data of the target item at a timing before the target item is gripped by the manipulator;
a geometric center identifying unit configured to identify a position of a geometric center of a top surface of the target item, based on the image data;
a grip position determining unit configured to determine a grip position at which the target item is to be gripped by the gripping unit; and
a center of mass identifying unit configured to identify a position of a center of mass of the target item based on (i) the magnitude of at least one of the force and the torque represented by the force sensation information in a case where the gripping unit grips the target item at the grip position and the target item is lifted up by the gripping unit and (ii) the grip position of the target item, and wherein the grip position determining unit is for determining a position to be a more suitable grip position of the target item in a case where a distance between a position of the geometric center of the top surface of the target item and a position at which the center of mass of the target item is projected onto the top surface of the target item is greater than a third threshold value.

11. The control apparatus according to claim 1, further comprising:
a third detecting unit configured to detect at least one of an identification problem of the target item, a gripping problem of the target item, and damage of the target item, in a case where an absolute value of a difference between (i) mass of the target item determined based on the magnitude of at least one of the force and the torque represented by the force sensation information in a case where the gripping unit lifts up the target item and (ii) the mass of the target item represented by the mass information, is greater than a fourth threshold value.

12. The control apparatus according to claim 1, further comprising:
an adjusting unit configured to make a determination to adjust a transport speed of the target item in a case where the first detecting unit has detected the abnormality.

13. A transport apparatus comprising:
the control apparatus according to claim 1; and
the manipulator.

14. A non-transitory computer-readable storage medium having recorded thereon a program including instructions that, when executed by a computer, causes the computer to perform operations comprising:
acquiring force sensation information for representing a magnitude of at least one of a force and a torque at a distal end of a manipulator while a target item that is a target to be transported by the manipulator is being transported;
acquiring mass information for representing a predetermined value as a mass of the target item;
acquiring plan information representing content of a plan relating to a trajectory path of at least one of the distal end of the manipulator and a gripping unit for gripping the target item arranged at the distal end;
determining an estimated magnitude of at least one of a force and a torque for detecting at the distal end of the manipulator when the manipulator transports the target item, based on the mass information and the plan information; and
detecting an abnormality relating to transporting of the target item, based on the magnitude of at least one of the force and the torque represented by the force sensation information and based on the estimated magnitude of at least one of the force and the torque, by detecting a case where an absolute value of a difference between the magnitude of at least one of the force and the torque represented by the force sensation information and the estimated magnitude of at least one of the force and the torque is greater than a first threshold value, wherein the first threshold value is determined to become greater when a length of a delay time concerning the acquiring of the force sensation information is longer than a predetermined value.

15. A control method comprising:
acquiring force sensation information for representing a magnitude of at least one of a force and a torque at a distal end of a manipulator while a target item that is a target to be transported by the manipulator is being transported;
acquiring mass information for representing a predetermined value as a mass of the target item;
acquiring plan information representing content of a plan relating to a trajectory path of at least one of the distal end of the manipulator and a gripping unit for gripping the target item arranged at the distal end;
determining an estimated magnitude of at least one of a force and a torque for detecting at the distal end of the manipulator when the manipulator transports the target item, based on the mass information and the plan information; and
detecting an abnormality relating to transporting of the target item, based on the magnitude of at least one of the force and the torque represented by the force sensation information and based on the estimated magnitude of at least one of the force and the torque, by detecting a case where an absolute value of a difference between the magnitude of at least one of the force and the torque represented by the force sensation information and the estimated magnitude of at least one of the force and the torque is greater than a first threshold value, wherein the first threshold value is determined to become greater when a length of a delay time concerning the acquiring of the force sensation information is longer than a predetermined value.

* * * * *